(12) United States Patent
Hohjoh et al.

(10) Patent No.: US 12,456,160 B2
(45) Date of Patent: Oct. 28, 2025

(54) IMAGING SYSTEM, IMAGE PROCESSING APPARATUS, IMAGING DEVICE, AND RECORDING MEDIUM

(71) Applicants: Daisuke Hohjoh, Chiba (JP); Kazuhiro Matsumoto, Tokyo (JP); Ryoh Fukui, Kanagawa (JP)

(72) Inventors: Daisuke Hohjoh, Chiba (JP); Kazuhiro Matsumoto, Tokyo (JP); Ryoh Fukui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 458 days.

(21) Appl. No.: 17/614,559

(22) PCT Filed: Jun. 23, 2020

(86) PCT No.: PCT/IB2020/055897
§ 371 (c)(1),
(2) Date: Nov. 29, 2021

(87) PCT Pub. No.: WO2020/261101
PCT Pub. Date: Dec. 30, 2020

(65) Prior Publication Data
US 2022/0230275 A1    Jul. 21, 2022

(30) Foreign Application Priority Data

Jun. 27, 2019    (JP) .................................. 2019-119694

(51) Int. Cl.
*G06T 3/12* (2024.01)
*G06T 3/4038* (2024.01)
(Continued)

(52) U.S. Cl.
CPC .............. *G06T 3/4038* (2013.01); *G06T 3/12* (2024.01); *G06T 5/50* (2013.01); *G06T 5/80* (2024.01)

(58) Field of Classification Search
CPC .......... G06T 3/4038; G06T 3/12; G06T 5/50; G06T 5/80; G06T 3/608; H04N 23/611; H04N 23/698; H04N 5/2624; H04N 23/90

See application file for complete search history.

(56) References Cited

U.S. PATENT DOCUMENTS 5,268,853 A    12/1993 Tanaka et al.
5,337,168 A    8/1994 Fujii et al.
(Continued)

FOREIGN PATENT DOCUMENTS

CN    104160693 A    11/2014
CN    107710728        2/2018
(Continued)

OTHER PUBLICATIONS

Office Action issued May 30, 2023 in Japanese Patent Application No. 2019-119694, 7 pages.
(Continued)

*Primary Examiner* — Nay A Maung
*Assistant Examiner* — Dustin Bilodeau
(74) *Attorney, Agent, or Firm* — XSENSUS LLP

(57) ABSTRACT

An imaging system includes a plurality of imaging devices facing different directions and an output unit configured to output an output image generated based on the captured images. The plurality of imaging devices is configured to capture images. The output image having been generated based on the captured images covers a range of 360 degrees in at least a first direction. In the output image, an area where a subject is reflected in the captured images is placed at a predetermined position so as to prevent the area from being cut off at the edges of the output image.

13 Claims, 22 Drawing Sheets

(51) Int. Cl.
*G06T 5/50* (2006.01)
*G06T 5/80* (2024.01)

(56) References Cited

U.S. PATENT DOCUMENTS

| | | | |
|---|---|---|---|
| 5,359,549 A | 10/1994 | Tanaka et al. | |
| 2005/0012833 A1 | 1/2005 | Yokota et al. | |
| 2015/0042847 A1 | 2/2015 | Hohjoh | |
| 2016/0191797 A1* | 6/2016 | Okada | H04N 23/45 |
| | | | 348/36 |
| 2016/0269632 A1* | 9/2016 | Morioka | H04N 23/90 |
| 2018/0211443 A1 | 7/2018 | Abbas | |
| 2019/0005609 A1* | 1/2019 | Kato | G06T 3/12 |
| 2020/0257439 A1* | 8/2020 | Ogawa | G06F 3/04883 |
| 2020/0412948 A1 | 12/2020 | Hohjoh et al. | |

FOREIGN PATENT DOCUMENTS

| | | | |
|---|---|---|---|
| JP | 4-000531 | | 1/1992 |
| JP | 5-260317 | | 10/1993 |
| JP | 2005-033508 A | | 2/2005 |
| JP | 2013-135343 | | 7/2013 |
| JP | 2015228683 A | * | 12/2015 |
| JP | 2016-127377 A | | 7/2016 |
| JP | 2016-171577 | | 9/2016 |
| JP | 2016-194782 | | 11/2016 |
| JP | 2016-194783 | | 11/2016 |
| JP | 2016-194784 | | 11/2016 |
| JP | 2017-147535 | | 8/2017 |
| JP | 2019-009574 | | 1/2019 |
| JP | 2021-005829 | | 1/2021 |

OTHER PUBLICATIONS

International Search Report issued on Sep. 18, 2020 in PCT/IB2020/055897 filed on Jun. 23, 2020, 10 pages.
Office Action issued Sep. 21, 2023 in Chinese Patent Application No. 202080047334.8, 8 pages.

* cited by examiner

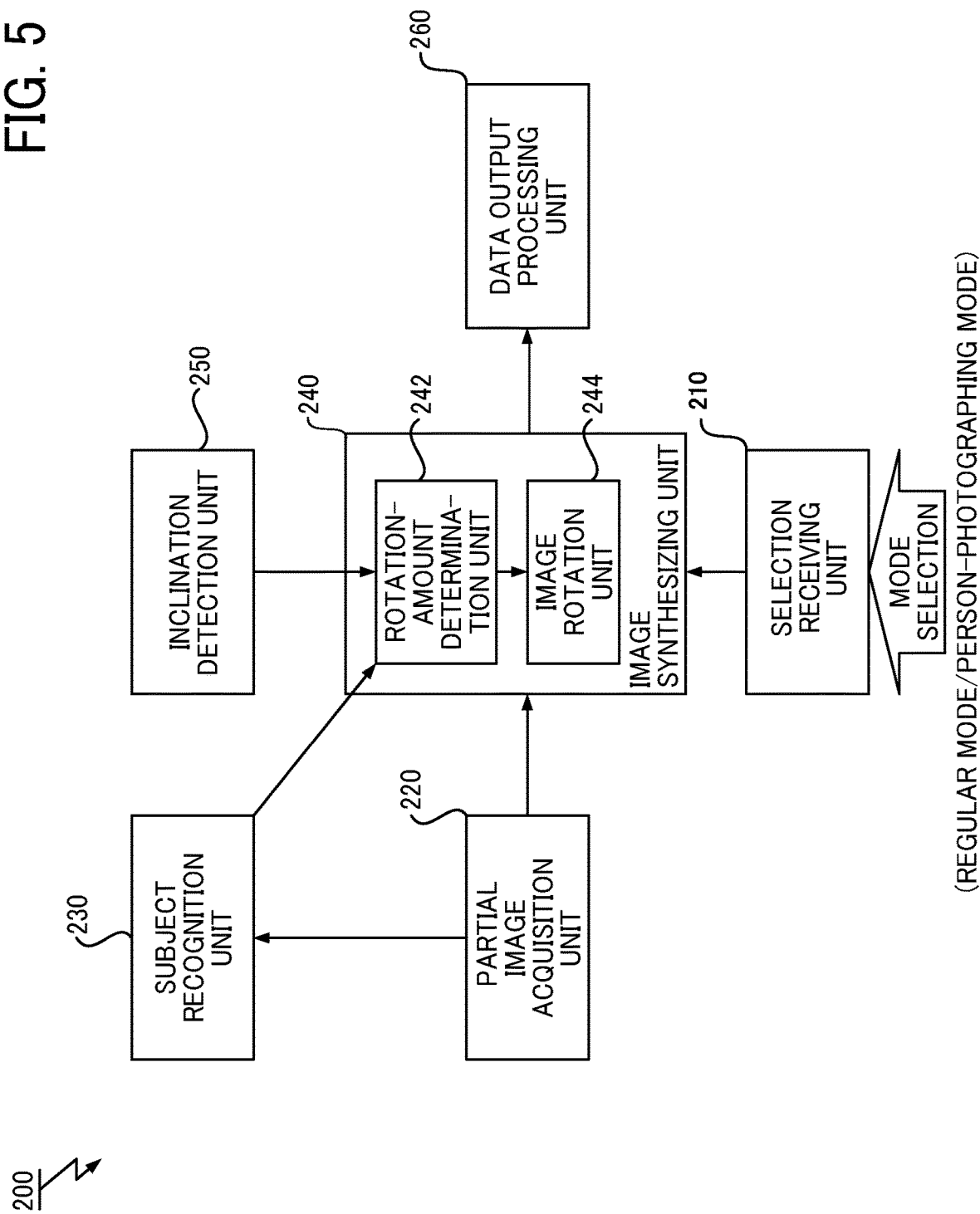

ROTATION (YAW)
CORRECTION

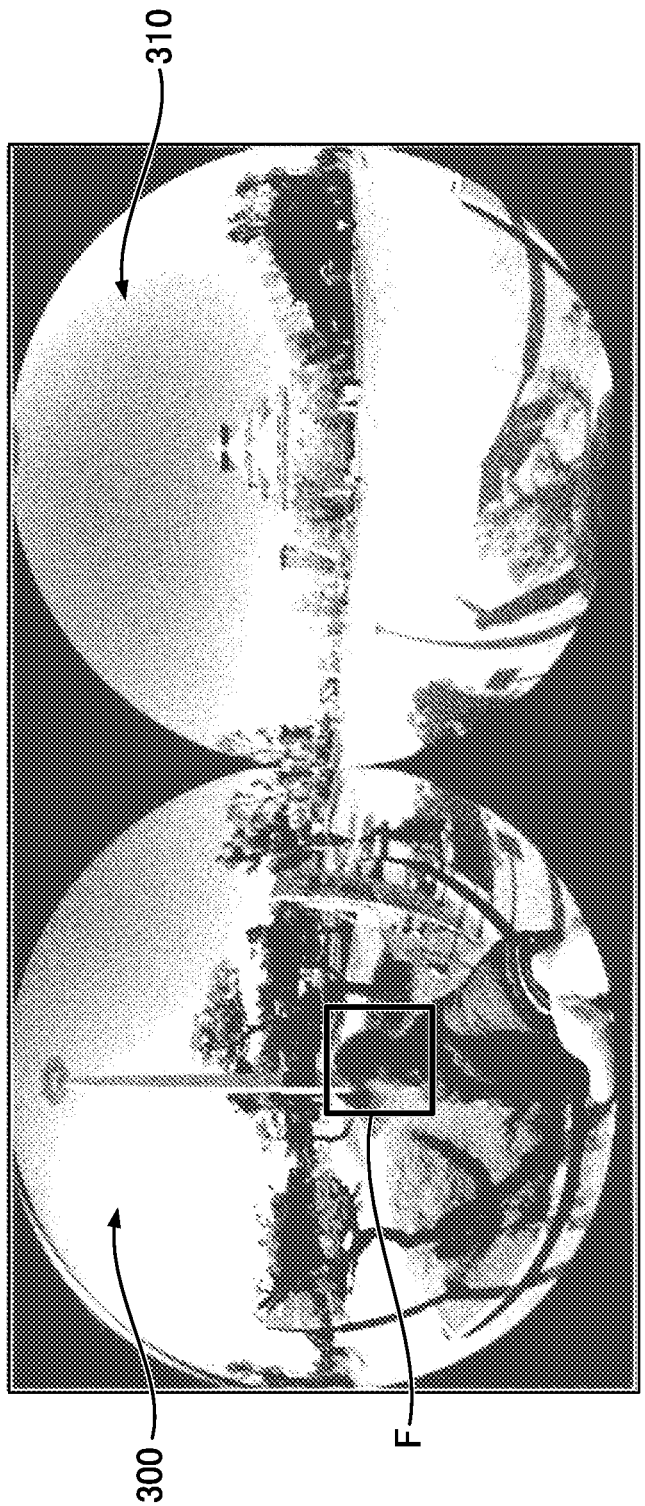

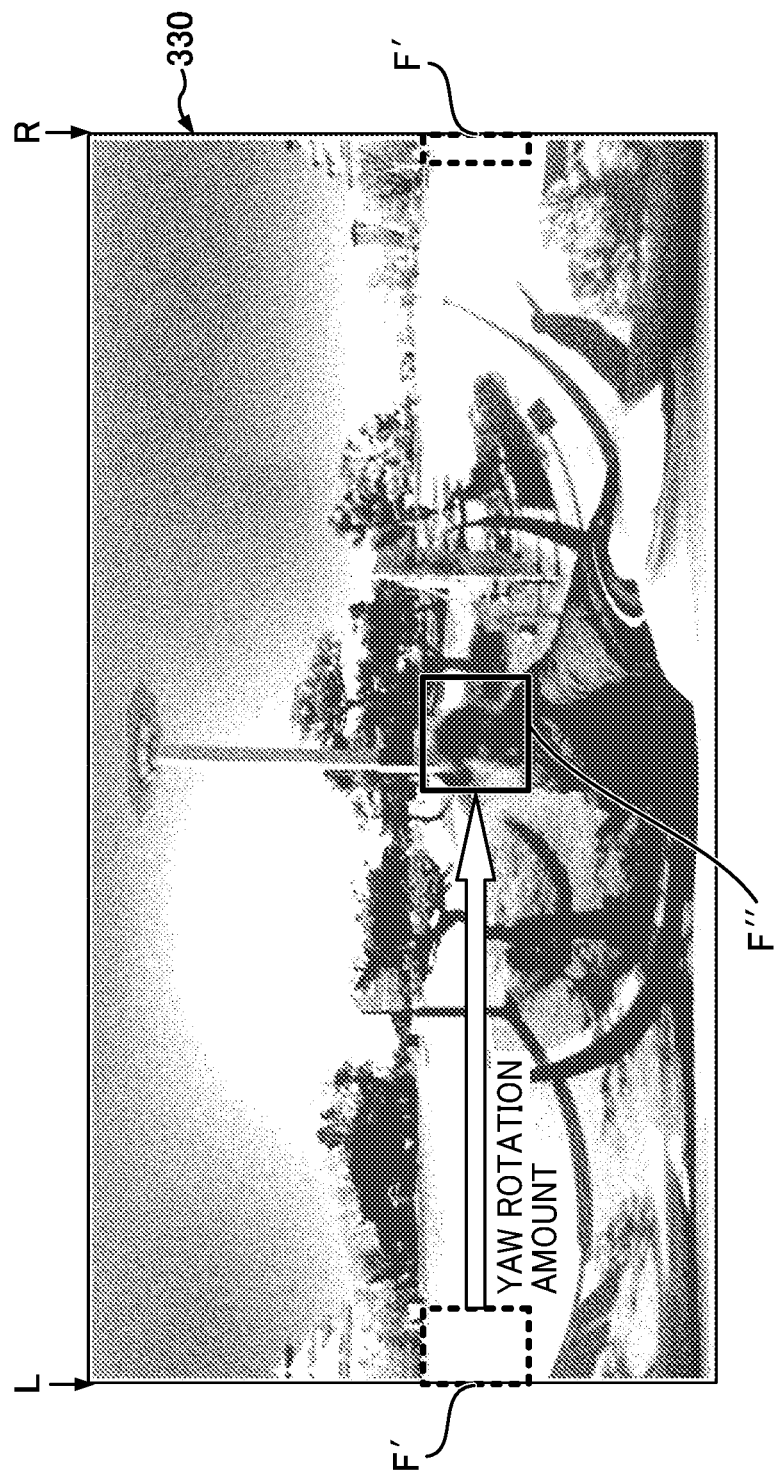

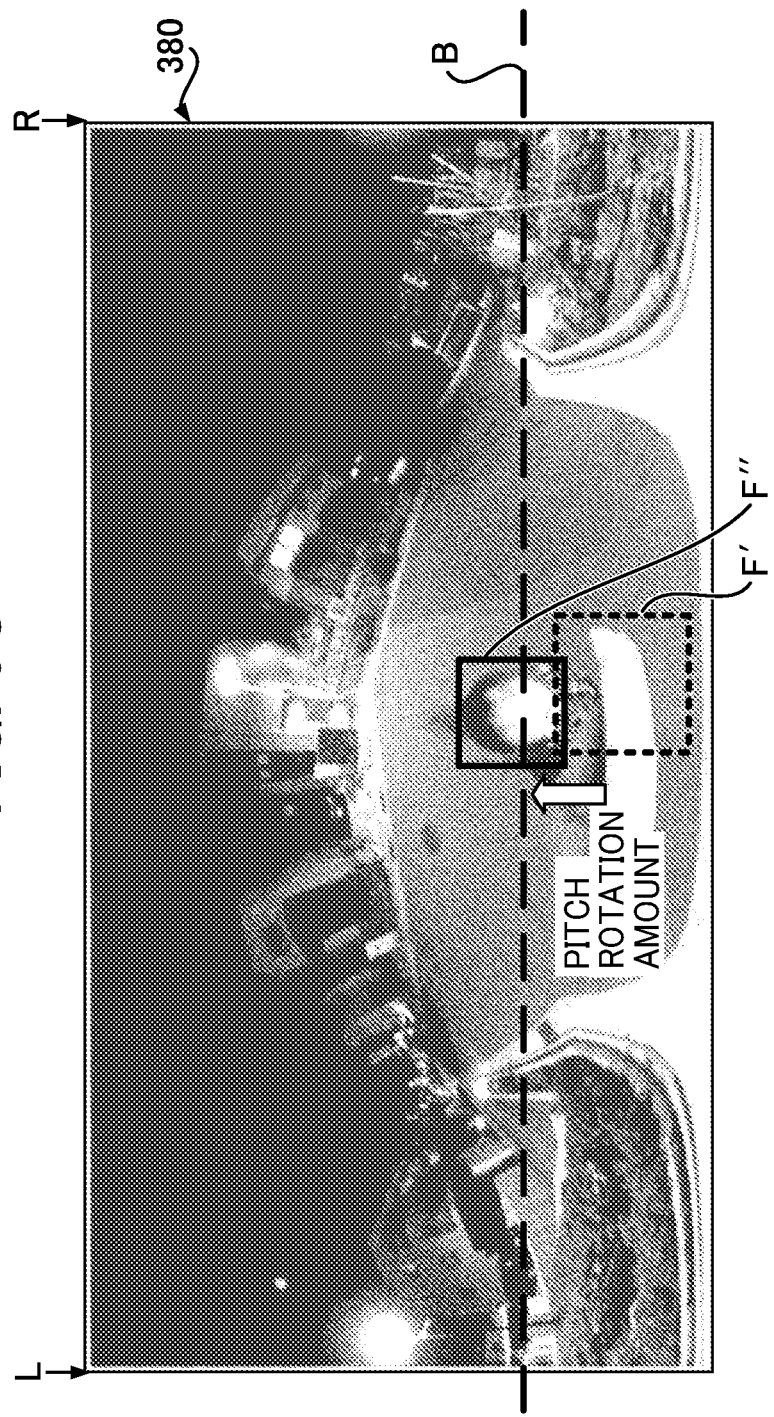

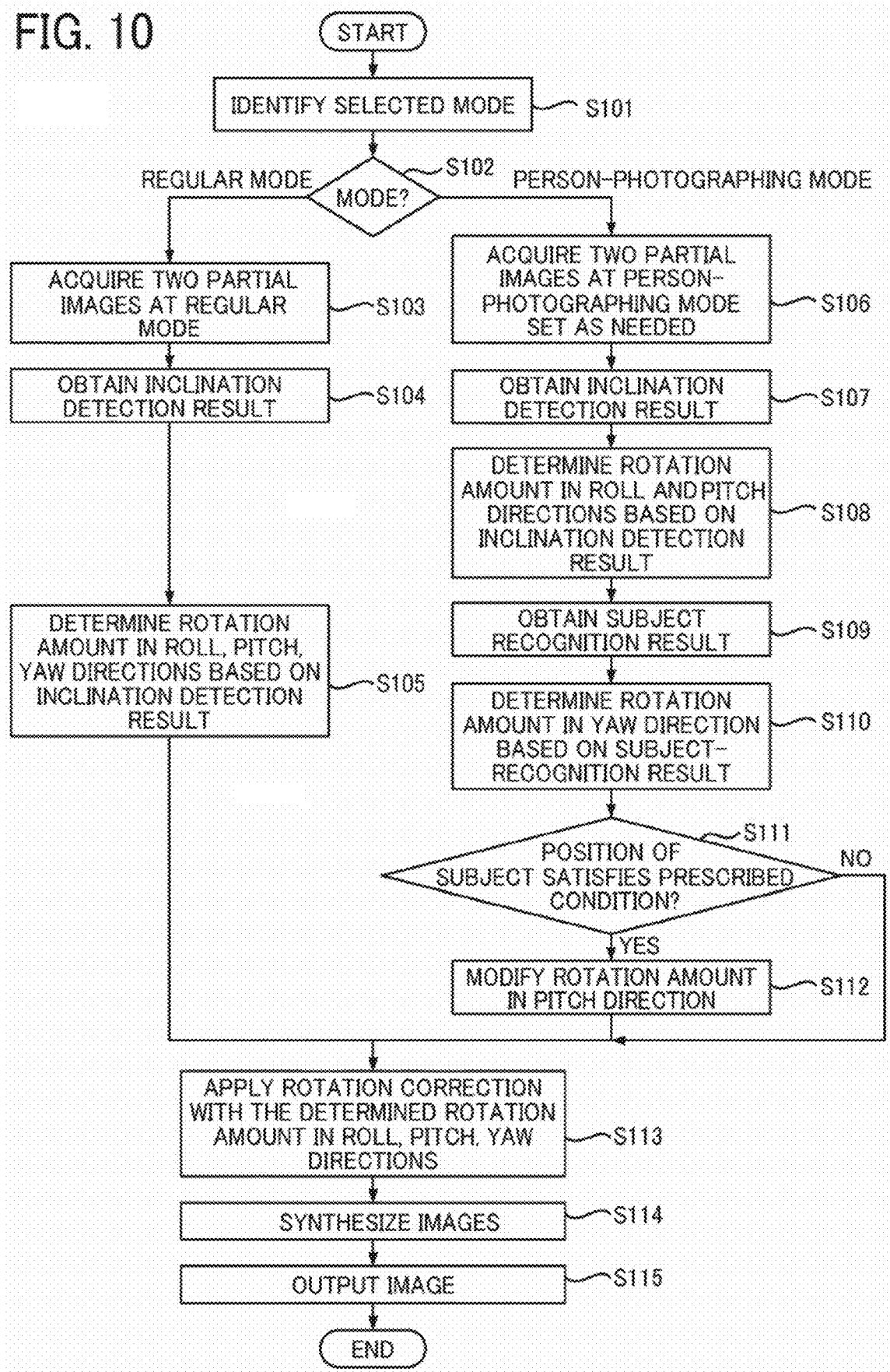

IMAGING SYSTEM, IMAGE PROCESSING APPARATUS, IMAGING DEVICE, AND RECORDING MEDIUM

CROSS-REFERENCE TO RELATED APPLICATIONS

The present application is based on PCT filing PCT/IB2020/055897, filed Jun. 23, 2020, which claims priority to Japanese Patent Application No. JP 2019-119694, filed on Jun. 27, 2019, the entire contents of each are incorporated herein by its reference.

TECHNICAL FIELD

The present disclosure relates to an imaging system, and more particularly, to an imaging system, an image processing apparatus, an imaging device, and a recording medium.

BACKGROUND ART

Conventionally, an imaging system is known that captures a plurality of partial images using a plurality of fish-eye lenses, performs distortion correction and projective transformation on the captured partial images, and combines the partial images captured by the fish-eye lenses so as to generate one spherical image. When viewing the spherical image with a dedicated viewer or a virtual reality (VR), an image that is generated by projecting a spherical image with a prescribed angle of view. However, when viewing the spherical image with a general-purpose image viewer or selecting an image with a dedicated viewer or a VR viewer, rectangular images are displayed in the spherical image format. In the case of displaying the spherical image as a rectangular image, when a person, such as a photographer, is included as a subject in the image, the entire face of the person might be cut off at the edges of a captured image, which results in an unnatural-looking image.

JP-2019-09574 discloses the technology related to the self photographing.

In producing a planar image obtained through the projective transformation of a spherical image captured by the selfie, the technology of JP-2019-009574 displays the image such that the photographer himself/herself is positioned in the center of the image. This technology deals with the poor recognizability of the face of photographer due to a different position and inclination of the face of the photographer for each displayed image.

The image processing apparatus of JP-2019-009574 includes image display means for displaying the entire-celestial-sphere image data; photographer detecting means for detecting a photographer; and control means for controlling the image display means to display the photographer in the center of the image when the photographer is detected by the photographer detecting means. However, such a technology still fails to create a natural-looking image that covers a range of 360 degrees in at least one direction, such as a spherical image.

CITATION LIST

Patent Literature

[PTL 1] JP-2019-009574-A

SUMMARY OF INVENTION

Technical Problem

In view of the above, it is an object of the present disclosure to provide an imaging system capable of outputting an output image that covers a range of 360 degrees in at least one direction while preventing a part of a subject from being cut off in such an output image.

Solution to Problem

In view of the above, there is provided an imaging system including a plurality of imaging devices facing different directions and an output unit configured to output an output image generated based on the captured images. The plurality of imaging devices is configured to capture images. The output image having been generated based on the captured images covers a range of 360 degrees in at least a first direction. In the output image, an area where a subject is reflected in the captured images is placed at a predetermined position so as to prevent the area from being cut off at the edges of the output image.

Advantageous Effects of Invention

The embodiments of the present disclosure enable output of an image that covers a range of 360 degrees in at least one direction while preventing a part of a subject from being cut off at the edge of the image.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIG. 5 is a functional block diagram of the spherical-image capturing apparatus according to an embodiment of the present disclosure.

FIGS. 8A, 8B, and 8C (FIG. 8) are illustrations for describing changes in the position of a main subject in a direction of the horizontal angle with respect to a spherical image, according to an embodiment of the present disclosure.

FIGS. 9A, 9B and 9C (FIG. 9) are illustrations for describing changes in the position of a main subject in a direction of the vertical angle with respect to a spherical image, according to an embodiment of the present disclosure.

FIG. 10 is a flowchart of a spherical-image capturing process performed by the spherical-image capturing apparatus according to an embodiment of the present disclosure.

DESCRIPTION OF EMBODIMENTS

Figure 1:
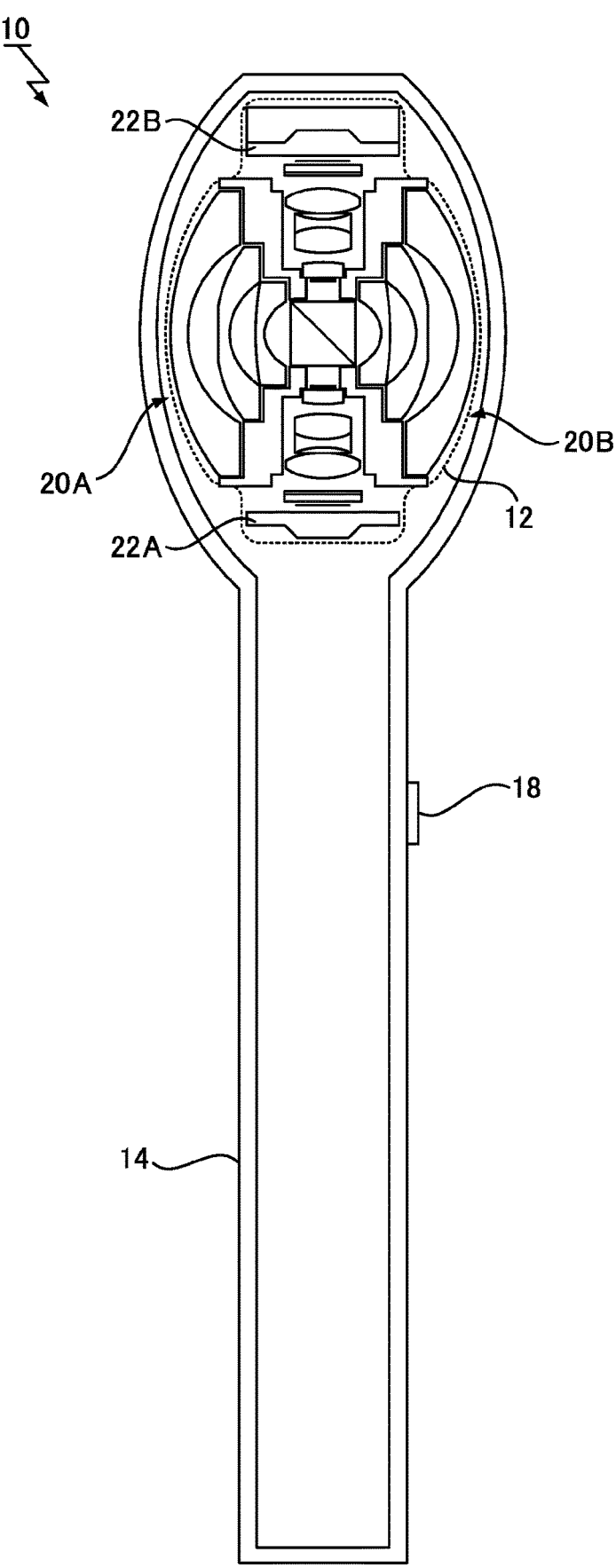
FIG. 1 is a sectional view of a spherical-image capturing apparatus according to an embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described in detail referring to the drawings. Like reference signs are applied to identical or corresponding components throughout the drawings and redundant description thereof may be omitted.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. In the following embodiment, the case where only a spherical-image capturing apparatus 10 constitutes an imaging system is described. However, the configuration of the imaging system is not particularly limited to the configuration according to the present embodiment. In some embodiments, the spherical-image capturing apparatus 10 and an information processing apparatus may constitute the imaging system.

Hereinafter, a description is given of the schematic configuration of the spherical-image capturing apparatus according to the present embodiment with reference to FIGS. 1 to 10. FIG. 1 is a sectional view of the spherical-image capturing apparatus 10 according to the present embodiment. The spherical-image capturing apparatus 10 in FIG. 1 includes an imaging body 12, a casing 14 that holds the imaging body 12 and components such as a control board and a battery, and a shutter button 18 provided on the casing 14.

The imaging body 12 illustrated in FIG. 1 includes two lens systems 20A and 20B (imaging optical systems) and two image sensors 22A and 22B. Each of the image sensors 22A and 22B may be, for example, a charge-coupled device (CCD) sensor or a complementary metal oxide semiconductor (CMOS) sensor. The image sensors 22A and 22B are arranged such that the imaging areas face in opposite directions. In the present embodiment, the cases where the two image sensors 22A and 22B are provided as a plurality of imaging devices for the two lens systems 20A and 20B are described. However, no limitation is no limitation is intended thereby. In another embodiment, each different part of one image sensor may be used as an imaging device, and an image may be formed on each part of one image sensor through the plurality of lens systems 20A and 20B. The lens system 20 is configured as a fish-eye lens consisting of, for example, seven elements in six groups or fourteen elements in ten groups. In the embodiment illustrated in FIG. 1, the-mentioned fish-eye lens has a full angle of view of larger than 180 degrees (=360 degrees/n, where n denotes the number of optical systems and n is 2), preferably has an angle of view of 190 degrees or larger. In the present embodiment, the cases where the two fish-eye lenses each having a total angle of view of larger than 180 degrees are used are described. No limitation is intended thereby. Three or more lens systems and image sensors may be used as long as a predetermined angle of view is obtained as a whole. Further, the spherical-image capturing apparatus 10 is not limited to fisheye lenses, and may include other types of lenses such as wide-angle lens or super-wide-angle lenses as long as a predetermined angle of view is obtained as a whole.

The relative positions of the optical elements (lenses, prisms, filters, and aperture stops) of the two lens systems 20A and 20B are determined with reference to the image sensors 22A and 22B. More specifically, positioning is made such that the optical axis of the optical elements of each of the lens systems 20A and 20B is positioned at the central part of the light receiving area of corresponding one of the image sensors 22 orthogonally to the light receiving area, and such that the light receiving area serves as the imaging plane of corresponding one of the fish-eye lenses. In order to reduce the parallax, folded optics may be adopted. Folded optics is a system in which light, converged by two lens systems 20A and 20B, can be divided to two image sensors by the two rectangular prisms. However, the present application is not limited to this configuration, and a three-fold refraction structure may be used in order to further reduce parallax, or a straight optical system may be used to reduce costs.

In the implementation illustrated in FIG. 1, the lens systems 20A and 20B have the same specifications and are oriented in directions reverse to each other such that the optical axes thereof coincide with each other. The image sensors 22A and 22B convert the light distribution of the received light into an image signal, and sequentially output image frames to the image processing block of the controller board. As will be described later in detail, the images captured by the respective image sensors 22A and 22B are combined so as to generate an image over a solid angle of 4π steradian (hereinafter, such an image is referred to as a spherical image). The spherical image is obtained by photographing multiple images, all the directions viewable from a photographing location and combining the photographed imaged. While it is assumed in the example implementation described below that a spherical image is to be generated, an omnidirectional image, i.e., a so-called panoramic image obtained by photographing 360 degrees only in a horizontal plane may be generated as long as it covers a range of 360 degrees in at least one direction. Alternatively, an image that is a part of the image obtained by photographing omnidirectionally or 360 degrees in a horizontal plane may also be generated. (For example, a full sky (dome) image taken 360 degrees horizontally and 90 degrees vertically from the horizon). In the present embodiment, the spherical image may be obtained as a still image or as moving images.

Figure 2:
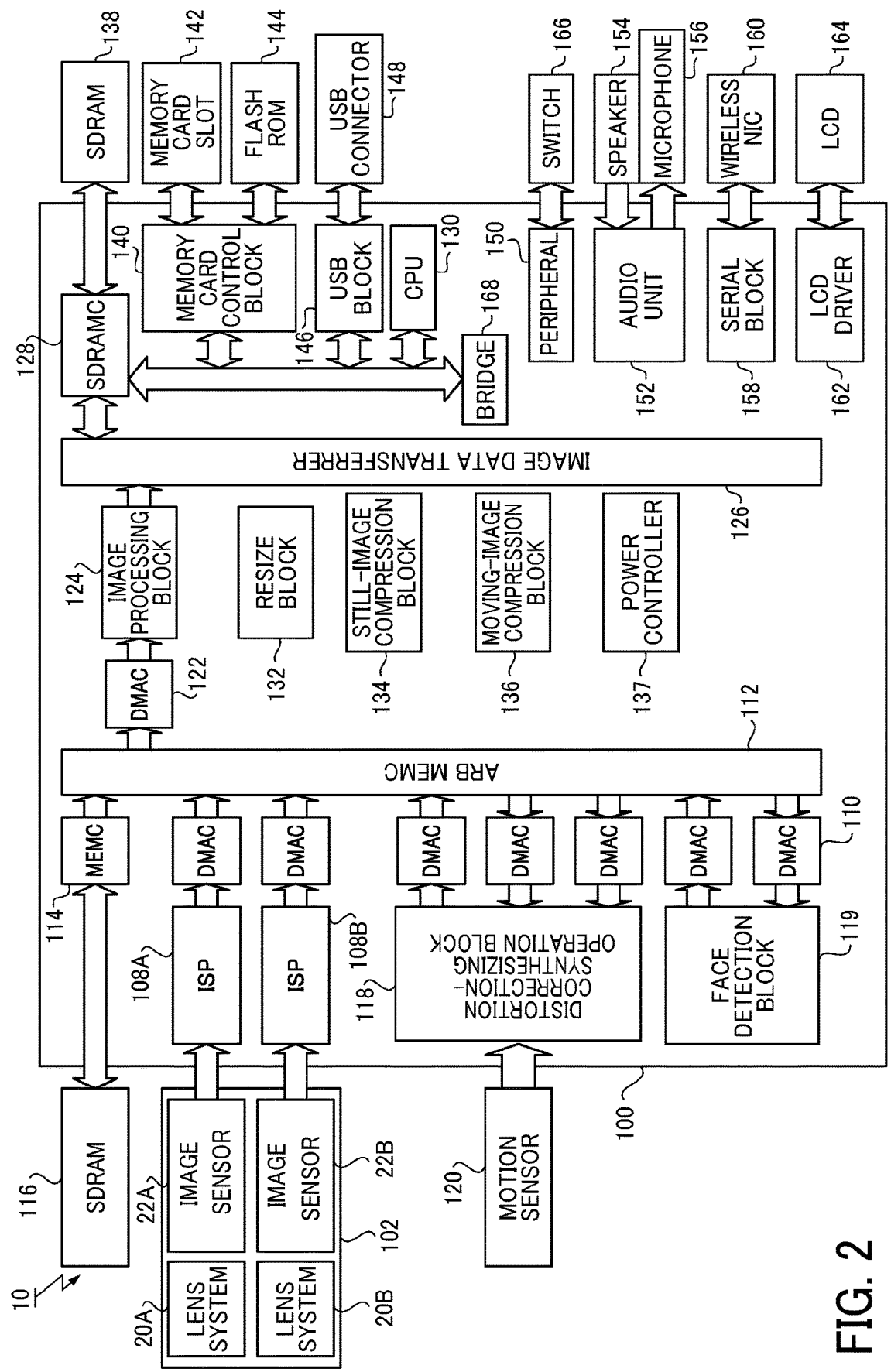
FIG. 2 is a block diagram of the hardware configuration of the spherical-image capturing apparatus according to an embodiment of the present disclosure.

FIG. 2 is a block diagram of the hardware configuration of the spherical-image capturing apparatus 10 according to the present embodiment. The spherical-image capturing apparatus 10 includes a digital still camera processor (simply referred to as processor below) 100, a lens barrel unit 102, and various elements connected with the processor 100. The lens barrel unit 102 includes the two pairs of lens systems 20A, 20B and image sensors 22A, 22B. The image sensor 22 is controlled by a command from a central processing unit (CPU) 130 of the processor 100. The CPU 130 will be described later in detail. Moreover, processor 100 and CPU 130, either separately or together, may be referred to as circuitry processing circuitry. The processor 100 includes Image Signal Processors (ISP) 108 (108A, 108B), Direct Memory Access Controllers (DMAC) 110, and an arbiter (ARBMEMC) 112 for arbitrating a memory access. In addition, the processor 100 includes a Memory Controller (MEMC) 114 for controlling the memory access, a distortion correction-synthesizing operation block 118, and a face detecting block 119. The ISPs 108A and 108B respectively performs Automatic Exposure (AE) control, Automatic white balance (AWB) setting, and gamma setting on images input through signal processing by the image sensors 22A and 22B. In FIG. 2, two ISPs 108A and 108B are provided corresponding to the two image sensors 22A and 22B. However, this is only one example, and one ISP may be provided for the two image sensors 22A and 22B.

The MEMC 114 is connected to a synchronous dynamic random access memory (SDRAM) 116 which temporarily stores data used in the processing of the ISPs 108A, 108B and the distortion correction-synthesizing operation block 118. The distortion correction-synthesizing operation block 118 performs distortion correction and vertical correction on the two partial-view images from the two pairs of the lens systems 20 and the image sensor 22 on the basis of information from a motion sensor 120 and synthesizes them. The motion sensor 120 may include a triaxial acceleration sensor, a triaxial angular velocity sensor, a geomagnetic sensor, and the like. A face detection block 119 performs face detection from the image and identifies the position of the person's face. In addition to the face detection block 119 or instead of the face detection block 119, an object recognition block for recognizing other subjects such as a full body image of a person, a face or whole body of an animal such as a cat or dog, a car or a flower may be provided.

The processor 100 further includes a DMAC 122, an image processing block 124, a CPU 130, an image data transferrer 126, an SDRAMC 128, a memory card control block 140, a USB block 146, a peripheral block 150, an audio unit 152, a serial block 158, an LCD (Liquid Crystal Display) driver 162, and a bridge 168.

The CPU 130 controls the operation of the elements of the spherical-image capturing apparatus 10. The image processing block 124 performs various image processing on image data. The processor 100 includes the resize block 132. The resize block 132 enlarges or shrinks the size of image data by interpolation. The processor 100 includes a still-image compression block 134. The still-image compression block 134 is a codec block for compressing and expanding the still images such as those in JPEG or TIFF format. The still-image compressing block 134 is used to generate still image data of the generated spherical image. The processor 100 includes a moving-image compression block 136. The moving-image compression block 136 is a codec block for compressing and expanding the moving images such as those in MPEG-4 AVC/H.264 format. The moving-image compression block 136 is used to generate the video data of the generated spherical image. In addition, the processor 100 includes a power controller 137.

The image data transferrer 126 transfers the image on which the image processing has been performed by the image processing block 124. The SDRAMC 128 controls the SDRAM 138 connected to the processor 100 and temporarily storing image data during image processing by the processor 100. The memory card control block 140 controls data read and write to a memory card and a flash ROM 144 inserted to a memory card slot 142 in which a memory card is detachably inserted. The USB block 146 controls USB communication with an external device such as personal computer connected via a USB connector 148. The peripheral block 150 is connected to a power switch 166.

The audio unit 152 is connected to a microphone 156 for receiving an audio signal from a user and a speaker 154 for outputting the audio signal, to control audio input and output. The serial block 158 controls serial communication with the external device and is connected to a wireless NIC (network interface card) 160. In the present embodiment, the wireless communication is established via wireless local area network (LAN) such as Wi-Fi (registered trademark). However, no limitation is intended therein. Alternatively, Bluetooth (registered trademark) or wireless USB may be used for the wireless communication. The communication may be established via the mobile communication system such as the third generation mobile communication system (3G), the fourth generation mobile communication system (4G), or the fifth generation mobile communication system (5G). The 5G communication system is superior to 4G in high speed, large capacity, low delay, and the like, and is advantageous in the transmission of image data from the spherical-image capturing apparatus 10 to an external device. The Liquid Crystal Display (LCD) driver 162 is a drive circuit for the LCD 164 and converts the image data to signals for displaying various kinds of information on an LCD 164. In addition to what is illustrated in FIG. 2, video interfaces such as HDMI (High-Definition Multimedia Interface) (registered trademark) may be included.

The flash ROM 144 stores a control program written in a code that can be decoded by the CPU 130 and various parameters. When a power supply is turned on by operating the power switch 166, the control program is loaded to a main memory, and the CPU 130 controls operations of the respective units of the device according to the program read into the main memory. Concurrently, the SDRAM 138 and a local SRAM (Static Random Access Memory) temporarily store data required for control. By using rewritable flash ROM 144, the control program and the parameter for control can be changed, and a version of the function can be easily updated.

Figure 3:
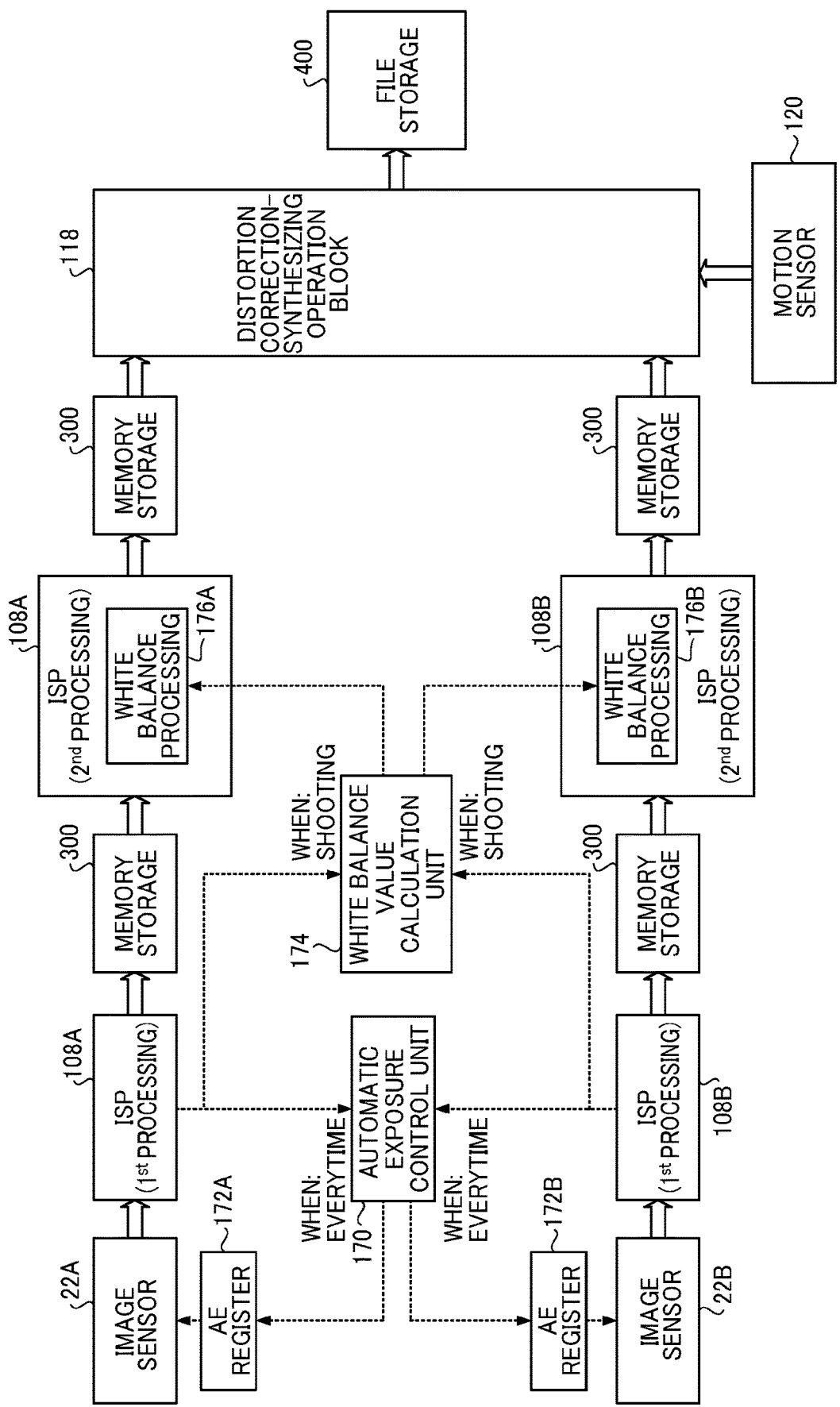
FIG. 3 is a diagram for describing a flow of entire image processing of the spherical-image capturing apparatus according to an embodiment of the present disclosure.

FIG. 3 is a diagram for describing a flow of entire image processing of the spherical-image capturing apparatus according to the present embodiment.

As illustrated in FIG. 3, each of the image sensors 22A and 22B captures an image under the prescribed exposure condition parameters. Subsequently, the ISPs 108A and 108B illustrated in FIG. 2 perform the first image signal processing (the first processing) on the images output from the image sensors 22A and 22B, respectively. In the first image signal processing, the optical black (OB) correction process, the defective pixel correction process, the linear correction process, the shading correction process, and the area dividing average process are performed. The processed data is stored in the memory 300.

After the first image signal processing (ISP1) is completed, the ISPs 108A and 108B subsequently perform the second image signal processing (the second processing). In the second image signal processing, the white balance (WB) gain process 176, the Bayer interpolation process, the color correction process, the gamma (γ) correction process, the YUV conversion process, and the edge enhancement (YCFLT) process are performed. The processed data is stored in the memory 300.

The automatic exposure control unit 170 sets the image sensors 22A and 22B to a proper exposure value using the area integrated value obtained by the area dividing average process, so as to make the brightness at the image boundary area of the both eyes' images similar to each other. As the exposure condition parameters, shutter speed, ISO sensitivity, and aperture value and the like may be used, but the aperture value may be fixed value. By setting the shutter speeds of the image sensors 22A and 22B to be the same, a moving object across the image sensors 22A and 22B can be satisfactorily connected. The exposure condition parameters for the image sensors 22A and 22B are set from the automatic exposure control unit 170 to AE registers 172A and 172B of the image sensors 22A and 22B. Based on the integration value data of RGB for each divided area calculated by the area dividing average process, the white balance calculating unit 174 calculates the parameters of the white balance processing for the image sensors 22A and 22B. The automatic exposure control unit 170 and the white balance calculation unit 174 optimize the brightness and color of the skin based on the detection result of the face detection block 119 and the like.

The image data after the second image signal processing is sent to the distortion correction-synthesizing operation block 118, the distortion correction-synthesizing operation block 118 performs the distortion correction and synthesizing operation, and a spherical image is generated. Then, based on the information received from the motion sensor 120, the distortion correction and synthesizing operation performs zenith correction and rotation correction representing inclination correction. When the image is a still image, for example, the image is appropriately JPEG compressed in the still-image compression block 134 in FIG. 2, and the data is stored in the memory 300, and a file is stored (tagging).

When the image is a moving image, for example, the image is appropriately converted into a moving image format such as MPEG-4 AVC/H.264 at the moving-image compression block 136 in FIG. 2, and the data is stored in the memory 300, and a file is stored (tagging). In the present embodiment, it is assumed that the image data is stored as a file in the internal storage area. However, the image data may be stored in a medium such as an SD card. The data is transferred to the information processing apparatus 50 as smartphone (mobile terminal and the like) using wireless LAN (Wi-Fi (registered trademark)), Bluetooth (registered trademark), and the like.

Figure 4A:
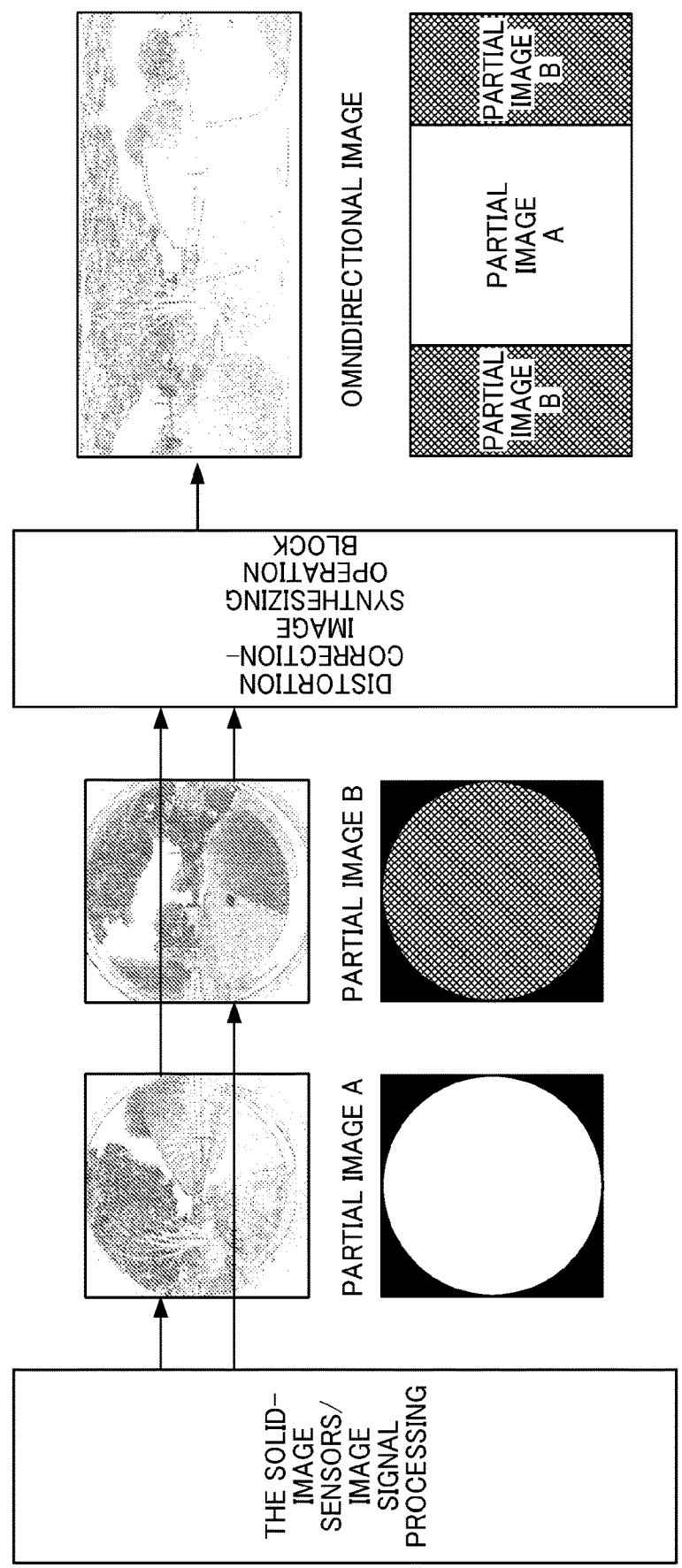
FIG. 4A is a data flow diagram for describing generation of a spherical image.

Hereinafter, a description relating to generation of a spherical image and the generated spherical image is provided with reference to FIGS. 4A, 4B, and 4C. FIG. 4A is an illustration of the data structure of each image and the data flow of the image in the process of generating a spherical image.

First, images directly captured by each of the image sensors 22A and 22B roughly cover a hemisphere of the whole sphere as a field of view. Light that passes through each lens system 20 (20A/20B) is focused on the light receiving area of the corresponding image sensor 22 (22A/22B) to form an image according to a predetermined projection system. The image sensor 22(22A/22B) is a two-dimensional image sensor defining a planar area of the light receiving area. Accordingly, the image formed by the image sensor 22 is image data represented by a plane coordinate system.

Such a formed image is a typical fish-eye image that contains an image circle as a whole in which each captured area is projected, as illustrated in a partial image A and a partial image B in FIG. 4A.

A plurality of the partial images captured by the plurality of image sensors 22A and 22B is then subjected to distortion correction and synthesis processing to form a spherical image (an image in equirectangular format). In the synthesis processing, a spherical image, which constitutes a complementary hemispherical portion, is generated from each planar partial image. Then, the images including the respective hemispherical portions are joined together by a stitching processing by matching the overlapping areas of the hemispherical portions, and the spherical images are synthesized to generate a full spherical image including a whole sphere. The images of the respective hemispherical portions include overlapping areas, but in the synthesis process the overlapping areas are blended to make the joint natural-looking between the two images.

Figure 4B:
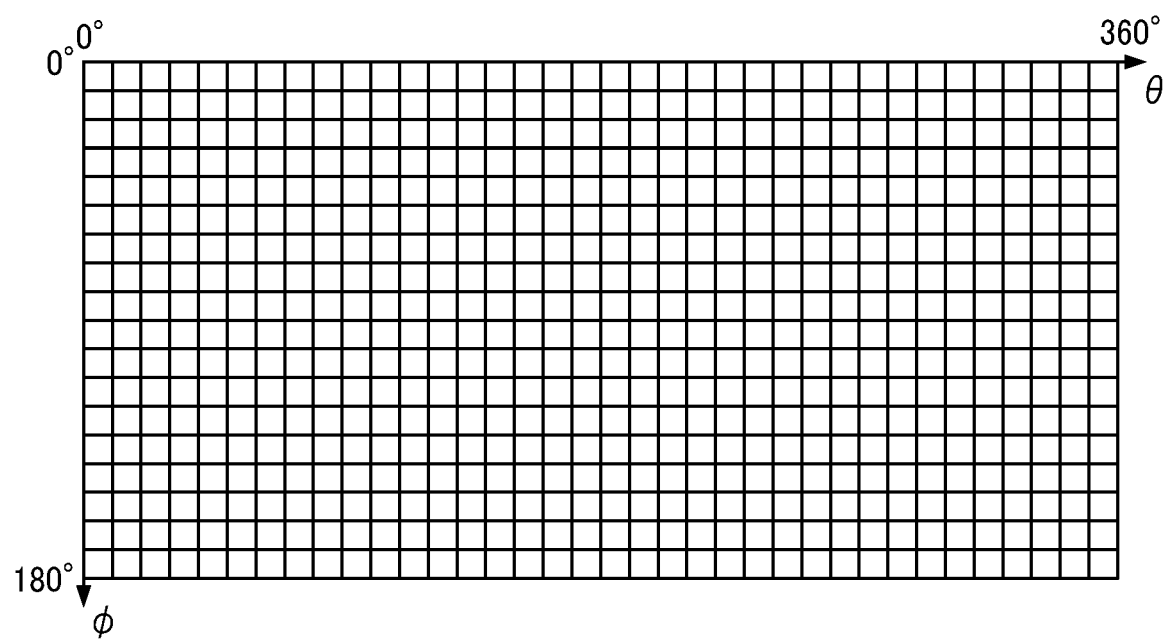
FIG. 4B is an illustration of a planar data structure of a spherical image.

FIG. 4B is an illustration of a planar data structure of the image data of a spherical image used in the embodiment of the present disclosure.

Figure 4C:
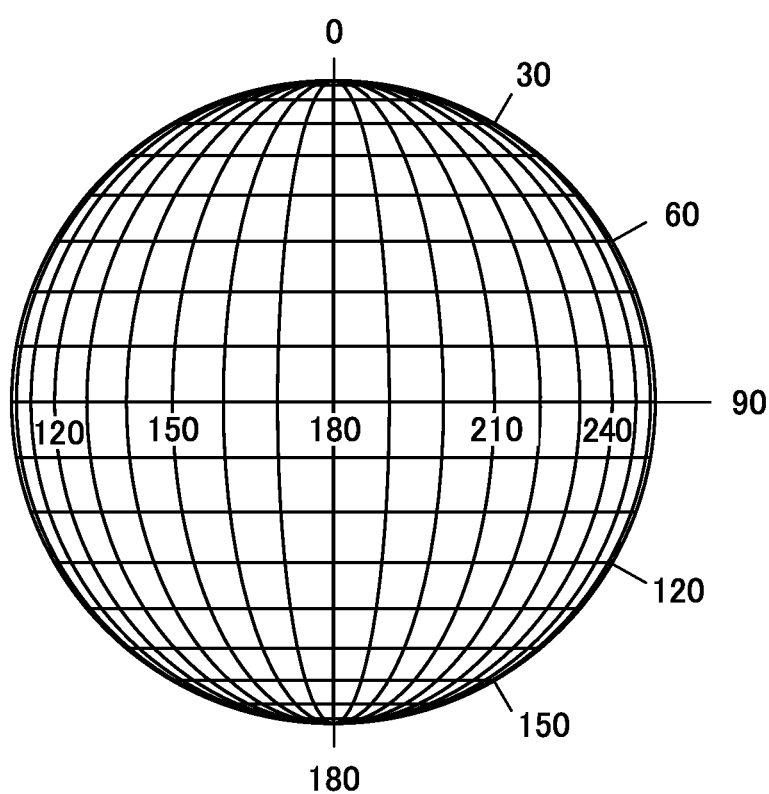
FIG. 4C is an illustration of a spherical data structure of the spherical image.

FIG. 4C is an illustration of a spherical data structure of the image data of the spherical image.

As illustrated FIG. 4B, the image data in the spherical image is represented by an array of pixel values having coordinates of a vertical angle φ that corresponds to an angle relative to a predetermined axis, and a horizontal angle θ that corresponds to a rotation angle around the axis. The horizontal angle θ is represented in the range of 0 to 360 degree (or −180 degree to +180 degree), and the vertical angle φ is represented in the range of 0 to 180 degree (or −90 degree to +90 degree).

As illustrated in FIG. 4C, every pair of coordinates values (θ, φ) on a spherical image format is associated with a point on the spherical surface representing omni-azimuth having the imaging point as the center, and the omni-azimuth is mapped onto the entire celestial sphere image. The relationship between plane coordinates of an image captured by the fisheye lens, and coordinates on the spherical surface in the entire celestial sphere image can be associated with each other using a predetermined conversion table. The conversion table is generated beforehand at a manufacturer or the like, based on design data or the like of the respective lens optical systems, and following a predetermined projection model, and the data is used for converting a partial image into a spherical image.

In the embodiment described, the image to be output (an output image) is a spherical image represented by a spherical coordinate system (a polar coordinate system having a radius vector of 1 and two deviation angles $\theta$ and $\varphi$). Such a spherical image involves 360 degrees in the horizontal angular direction and also involves a 360-degree round trip in the vertical angular direction orthogonal to the horizontal angular direction (a full circle obtained by combining two half circles each involving 180 degrees). However, no limitation is intended thereby.

It is satisfactory as long as the image to be output is an image that covers a range of 360 degrees in at least one direction. In another embodiment, the output image may be an omnidirectional image (a 360-degree panoramic image) that has a predetermined angle of view in the vertical angular direction and covers a range of 360 degrees in the horizontal angular direction. Alternatively, the image may be a full sky image (a dome image) having an angle of view of 0 to 90 degrees in the vertical angular direction and covering a range of 360 degrees in the horizontal angular direction. When an omnidirectional image is used, it is represented by a cylindrical coordinate system having a radius vector of 1, one deviation angle $\theta$, and axial displacement z. When the full sky image is used, the spherical coordinate system has a vertical angle $\varphi$ of 0 to 90 degrees is used to express the full sky image.

Hereinafter, the spherical-image capturing process performed by the spherical-image capturing apparatus 10 according to the present embodiment is described with reference to FIGS. 5 to 10. FIG. 5 is a functional block diagram for describing the spherical-image capturing process performed by the spherical-image capturing apparatus 10 according to the present embodiment.

As illustrated in FIG. 5, the image processing unit 200 includes a selection receiving unit 210, a partial image acquisition unit 220 (an image acquisition unit), a subject recognition unit 230 (a recognition unit), an image synthesizing unit 240, an inclination detection unit 250, and a data output processing unit 260.

In the present embodiment, the spherical-image capturing apparatus 10 has a plurality of modes, one of which is a person-photographing mode. The person-photographing mode is a mode to be used by a user when shooting a person as a main subject. When this mode is selected, an image capturing process and a parameter suitable for such a case where the person is photographed as a main subject are selected. Although the spherical-image capturing apparatus 10 may have some other modes, the following description is given assuming that another mode other than the person-photographing mode is a regular mode. The selection receiving unit 210 receives selection of one of the plurality of modes.

In the example implementation described below, it is assumed that the person-photographing mode is an example of a mode for the main subject. However, the main subject is not limited to a person. Various types of object recognition techniques are known, and in other embodiments, the spherical-image capturing apparatus 10 may have a mode for photographing an animal such as a cat or dog, or another mode for photographing other objects such as cars and flowers.

The partial image acquisition unit 220 acquires, as an input image, the partial images captured by the image sensors 22A and 22B through the plurality of lens systems 20A and 20B facing different directions. Each of the plurality of acquired partial images has a different captured range as described above.

Upon receiving selection of the person-photographing mode, the selection receiving unit 210 sets the photographing mode that gives a high priority to a detected face area and an image processing parameter for the image sensors 22 (22A and 22B) and the ISP 108 (108A and 108B), respectively. This setting enables reproducing the brightness and color of human skin in an optimal manner so as to look natural to the user.

The subject recognition unit 230 recognizes a predetermined subject that is reflected in the captured partial image, and generates a subject recognition result that includes position information of the area of the subject. The position information of the area of the subject is the coordinate values (coordinate values of the four corners when the recognized area of the subject is rectangular) that define the outer shape (for example, a rectangle) of the area recognized as the subject. Alternatively, the position information is the center coordinate values and the size (the center coordinate values, the vertical size, and the horizontal size of the rectangle when the recognized area of the subject is rectangular). Further, the number of subjects is not limited to one, and more than one subjects may be detected. In this case, the position information is detected for each subject.

Further, the subject recognition unit 230 is capable of recognizing a subject over the plurality of partial images. The position information (planar coordinate system) of the area of the subject recognized over the plurality of partial images is appropriately mapped onto the coordinate system of a spherical image (the spherical coordinate system).

However, no limitation is intended thereby. In some embodiments, a plurality of partial images is subjected to the distortion correction and synthesis processing before recognizing a subject in the obtained spherical image (a synthesized image).

The face detection block 119 in FIG. 2 is used to recognize a subject, but no limitation is intended thereby. In the present embodiment, the subject is assumed to be the face or the whole body of a person as the person-photographing mode is selected. However, when a mode for photographing an animal or other objects is prepared, the subject may be the face or whole body of an animal, a part or whole of an object.

The inclination detection unit 250 detects the inclination of the spherical-image capturing apparatus 10 (the imaging body 12) relative to a prescribed reference direction by controlling the motion sensor 120 in FIG. 2. Typically, the prescribed reference direction refers to a vertical direction in which the acceleration of gravity is applied. The inclination detection unit 250 measures each acceleration component of the motion sensor 120 and generates an inclination detection result. Based on the inclination detection result, the zenith correction to be described later is performed.

The image synthesizing unit 240, which is described above with reference to FIG. 5, generates a spherical image by performing the distortion correction and synthesis processing on the captured plurality of partial images and synthesizing the processed partial images. The image synthesizing unit 240 receives the selected mode output from the selection receiving unit 210, and switches its own operation according to the mode selected between the person-photographing mode and the regular mode. The image synthesizing unit 240 constitutes a generation unit in the present embodiment.

More specifically, the image synthesizing unit 240 includes a rotation-amount determination unit 242 and an image rotation unit 244. The image rotation unit 244 applies the rotation correction in the roll, pitch, and yaw directions to the spherical image generated by the image synthesizing unit 240. The rotation-amount determination unit 242 determines a rotation amount in each of the roll, pitch, and yaw directions for rotation correction performed by the image rotation unit 244.

In the regular mode, based on the inclination detection result of the inclination detection unit 250, the image rotation unit 244 performs the rotation correction (zenith correction) in the roll and pitch directions, and also performs the rotation correction in the yaw direction if needed. In the present embodiment, in the person-photographing mode, the image rotation unit 244 performs the rotation correction in the roll, pitch, and yaw directions based on the recognition result of the subject recognition unit 230 in addition to the inclination detection result of the inclination detection unit 250.

The following describes the rotation correction in the roll and pitch directions (zenith correction) and rotation correction in the yaw direction that are performed based on the inclination detection result at the regular mode, with reference to FIGS. 6A, 6B, 7A, 7B, 7C, and 7D.

Figure 6A:
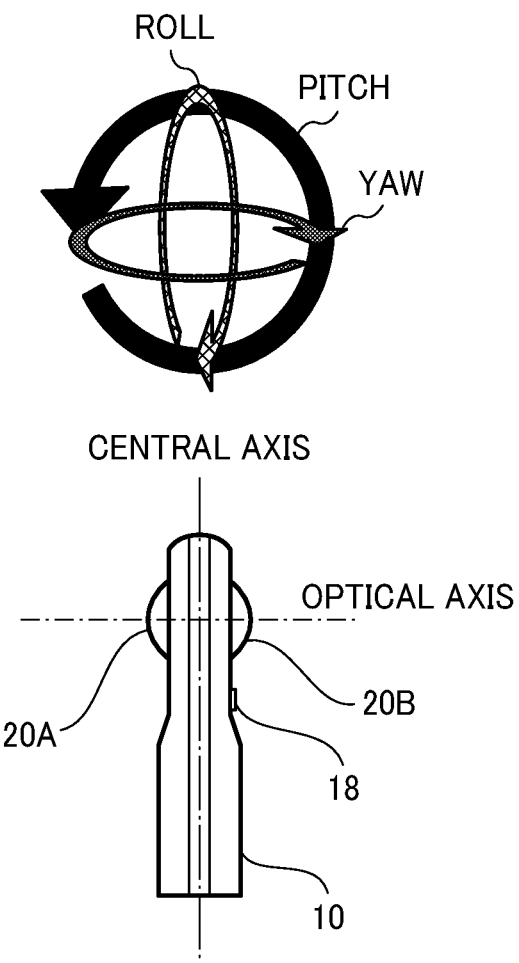
FIGS. 6A and 6B (FIG. 6) are illustrations for describing the definition of the orientation of the spherical-image capturing apparatus according to an embodiment of the present disclosure.
Figure 6B:
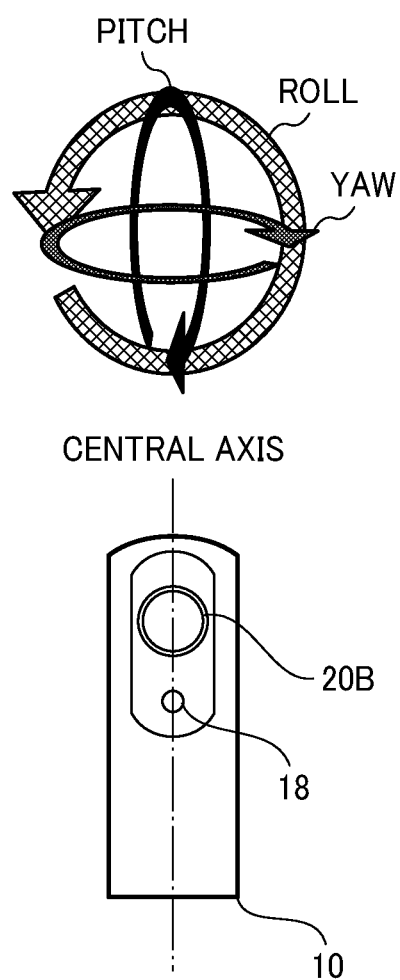

FIGS. 6A and 6B are illustrations for describing the definition of the orientation of the spherical-image capturing apparatus 10 according to the present embodiment. FIG. 6A indicates the definition of the orientation viewed from the side of the spherical-image capturing apparatus 10, and FIG. 6B indicates the definition of the orientation viewed from the front of the spherical-image capturing apparatus 10.

As illustrated in FIGS. 6A and 6B, device angle of the spherical-image capturing apparatus 10 is defined as roll, pitch and yaw. As the optical axis direction passing through the center of the two lenses of the spherical-image capturing apparatus 10 is as the front-rear direction, a rotation angle (roll) is an angle around an axis and the front-rear direction of the spherical-image capturing apparatus 10, a rotation angle (pitch) is an angle around an axis about the left-right direction of the spherical-image capturing apparatus 10 and a rotation angle (yaw) is an angle around an axis about the top-bottom direction of the spherical-image capturing apparatus 10. A rotation that bows the spherical-image capturing apparatus 10 with one lens (for example, the lens opposite to the side where the shutter button 18 is located) as the front surface is represented by a pitch. A lateral rotation around the lens optical axis of the spherical-image capturing apparatus 10 is represented by a roll, and a rotation around the central axis of housing of the spherical-image capturing apparatus 10 is represented by a yaw.

FIGS. 7A, 7B, 7C, and 7D are illustrations for describing rotation correction in the roll and pitch directions (zenith correction) and rotation correction in the yaw direction applied to a spherical image, according to the present embodiment.

Figure 7A:
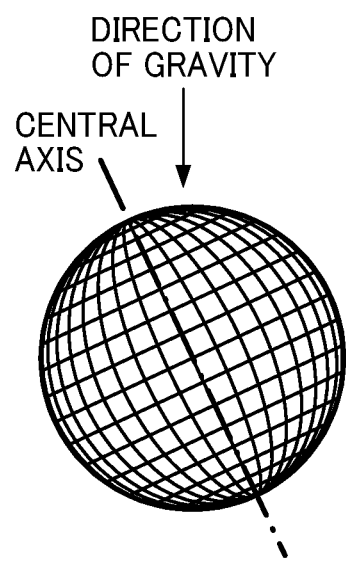
FIGS. 7A, 7B, 7C, and 7D (FIG. 7) are illustrations for describing rotation correction in the roll and pitch directions (zenith correction) and rotation correction in the yaw direction performed on a spherical image, according to an embodiment of the present disclosure.
Figure 7B:
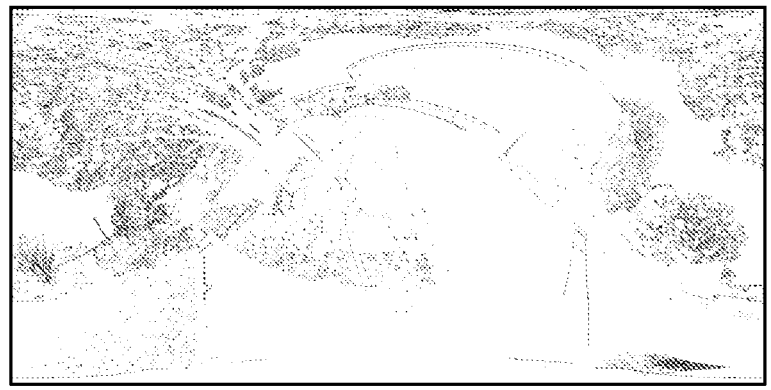
Figure 7C:
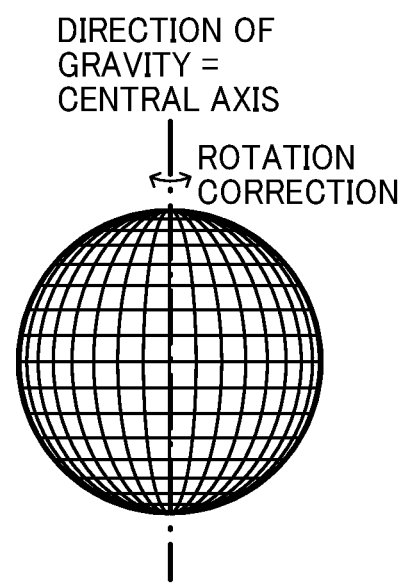
Figure 7D:
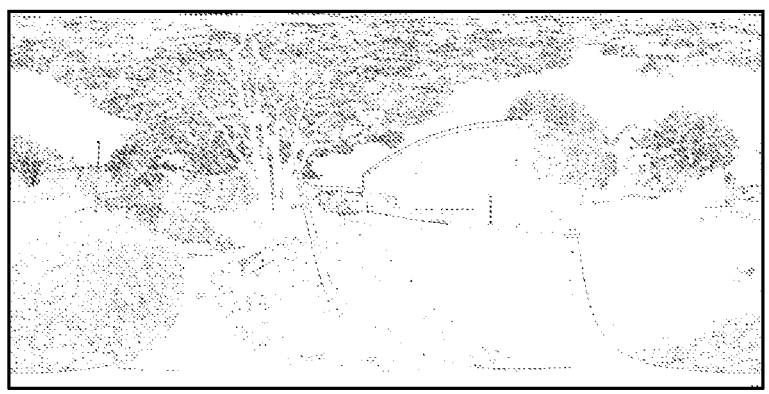

In particular, FIGS. 7A and 7B are illustration for describing the definition of a spherical image before zenith correction and the generated spherical image, and FIGS. 7C and 7D are illustration for describing the definition of a spherical image after zenith correction and the generated spherical image.

As described above, the image data of a spherical image format is expressed as an array of pixel values where the vertical angle $\varphi$ corresponding to the angle with reference to a certain axis z0 and the horizontal angle $\theta$ corresponding to the angle of rotation around the axis z0 are the coordinates.

If no correction is made, the certain axis z0 is defined with reference to the spherical-image capturing apparatus 10. For example, the axis z0 is defined as the central axis, which defines the horizontal angle $\theta$ and the vertical angle $\varphi$, passing through the center of the casing 14 from the bottom to the top where the top is the imaging body 12 side and the bottom is the opposite side of the spherical-image capturing apparatus 10 in FIG. 1. Further, for example, the horizontal angle $\theta$ of a spherical image is defined such that the direction of the optical axis of the optical element of one of the image-forming optical system 20A and 20B lies in the center of the corresponding image sensor 22 at the horizontal angle $\theta$.

The zenith correction (correction in the direction of roll and the direction of pitch) is a correction processing that corrects the spherical images (FIG. 7C) captured with the central axis actually inclined with respect to the direction of gravity as illustrated in FIG. 7A, to a spherical image (FIG. 7D) captured with the central axis aligned with the direction of gravity as illustrated in FIG. 7B.

The rotation correction is a correction (correction in the direction of yaw) that rotates around the direction of gravity in the spherical image (FIG. 7D) to which the zenith correction has been made to have the central axis aligned with the direction of gravity. The rotation correction in the yaw direction may not be performed, but is applied according to selection based on a user's operation, for example, when the motion sensor 120 acquires the triaxial angular velocity and direction in addition to the triaxial acceleration and the spherical image is desired to be fixed in a specific direction (for example, magnetic north).

In the regular mode, the rotation-amount determination unit 242 calculates the rotation amount in the roll and pitch directions and, as desired, in the yaw direction based on the inclination detection result of the inclination detection unit 250. Then, based on the calculated rotation amount, the image rotating unit 244 applies the rotation to the image.

The following describes the rotation correction in the roll, pitch, and yaw directions based on the subject recognition result and inclination detection result at the person-photographing mode according to the present embodiment, with reference to FIGS. 8A, 8B, 8C, 9A, 9B and 9C. In the person-photographing mode, the position of the recognized subject is changed by rotation correction.

Figure 8B:
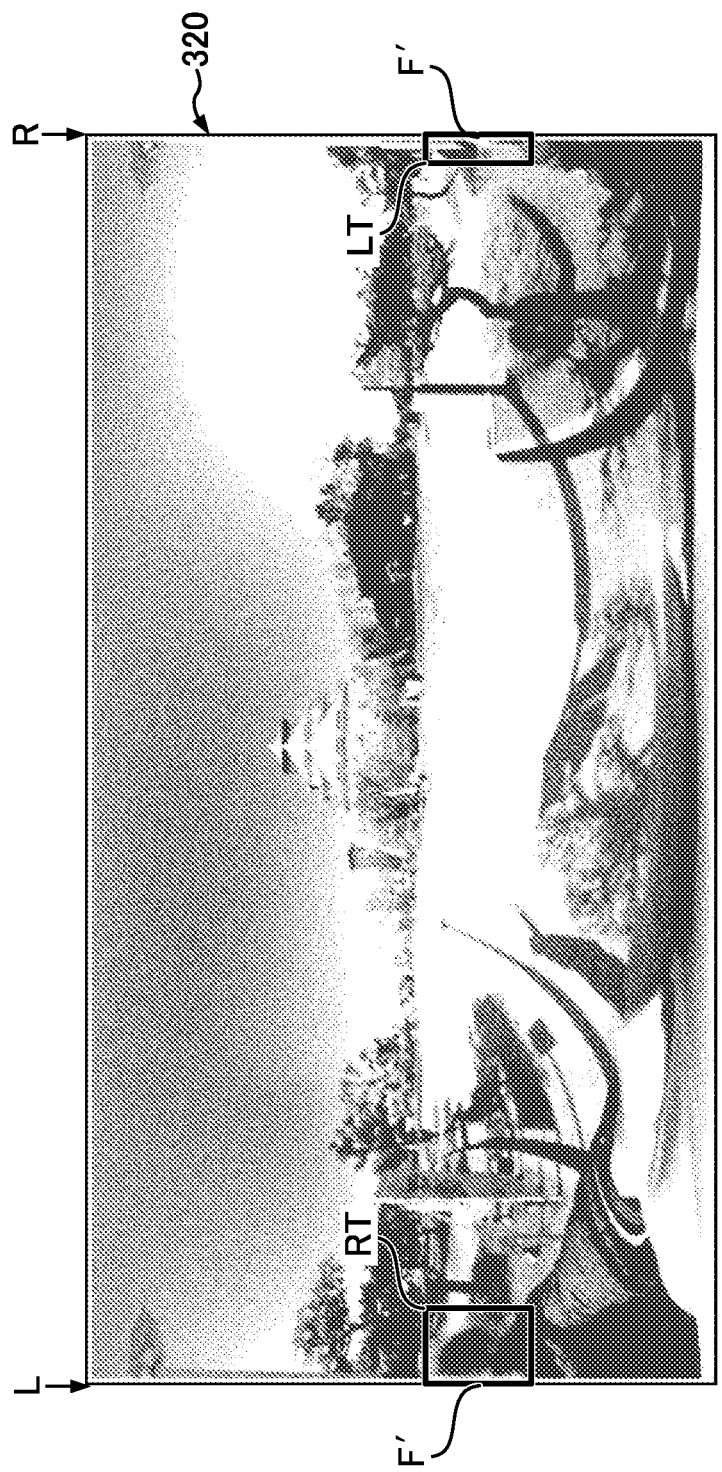

FIGS. 8A, 8B, and 8C are illustrations for describing changes in the position of a main subject in a direction of the horizontal angle with respect to a spherical image, according to the present embodiment.

FIG. 8A indicates two partial images 300 and 310, and FIG. 8B indicates a spherical image 320 on which zenith correction has been performed.

FIG. 8C indicates a spherical image 330 on which the position of the subject has been changed through the zenith correction and the rotation correction in the yaw direction based on the subject recognition result.

In FIG. 8A, a main subject (the face of a person) is recognized as an area F on the partial image 300. In FIG. 8B, an area F' of the main subject recognized in FIG. 8A is indicated in the spherical image 320 on which the zenith correction has been performed.

In the spherical image 320, on which the zenith correction has been performed, as illustrated in FIG. 8B, the area F' of the main subject is cut off at the edges L and R of the spherical image 320 in the left-right direction of the spherical-image capturing apparatus 10.

A user viewing such a spherical image 320 as illustrated in FIG. 8 doesn't feel strange by using a dedicated viewer or a VR viewer because the dedicated viewer or the VR viewer displays an image generated by projecting the spherical image at a predetermined angle of view. However, when a spherical-image format image is displayed by a general-purpose viewer, or when a scaled-down image (thumbnail) is displayed with a VR viewer or a general-purpose viewer, the spherical image is displayed as a rectangular image similarly to a typical two-dimensional image. In such cases, if the face of the person is cut off at the edges of the rectangular image, a displayed image might look like a strange picture.

In view of such circumstances, the present embodiment provides the person-photographing mode in which the rotation-amount determination unit 242 determines the rotation amount (rotation angle) in the yaw direction to place the recognized area F' of the subject at a predetermined position F''' in the horizontal direction relative to the original position of the area F', so as to prevent the area F' from being cut off at the edges L and R of the spherical image 330, as illustrated in FIG. 8C. The image rotation unit 244 rotates the spherical image 330 by the yaw rotation amount determined by the rotation-amount determination unit 242. The data output processing unit 260 outputs the spherical image 330 generated by rotating the image at the image rotating unit 244.

Preferably, the predetermined position F''' is a position closer to the center of the spherical image, and more preferably at substantially the center position. The data output processing unit 260 constitutes an output unit in the present embodiment.

The spherical image is a two-dimensional array of pixel values, and has a rectangular shape as is. Further, the spherical image is a full circle in the horizontal direction, and the images constituting the spherical image are actually connected to each other at the edges of 0 degree and 360 degrees of the spherical image. In such a spherical image, the rotation correction in the yaw direction circularly shifts the image in the horizontal direction. With a shift in the image, the portion that protrudes from the right edge R of the image moves to the left edge L of the image, and vice versa. This enables a change in the position of a subject within a spherical image without any inconsistency in a spherical image as a whole.

Without the rotation correction in the yaw direction, the horizontal angle θ of a spherical image is set such that the direction of the optical axis of one (for example, the lens system 20A) of the two lens systems 20A and 20B lies in the center of the horizontal angle θ. Accordingly, when the rotation correction in the yaw direction is performed, the pixel corresponding to the center of the lens system in a spherical image moves in the horizontal direction by the rotation amount in the yaw direction.

In addition, when a plurality of subjects is included in a captured image such that a plurality of people is photographed together, preferably, the rotation amount is determined to place the area where the plurality of subjects is put together at a position closer to the center of the spherical image in the horizontal direction, which prevents the area where the plurality of subjects is put together from being cut off at the edges of the spherical image. For example, when two people are photographed together in a captured image, a spherical image is generated such that the two people are placed in the center of the spherical image.

Similarly, when a plurality of subjects is included in a spherical image such that the subjects are apart from each other in the horizontal direction of the spherical image, the rotation amount is determined to prevent each of the subjects recognized within the spherical image from being cut off at the edges L and R of the spherical image as much as possible.

In so doing, the rotation amount may be determined to place the center of gravity of any one of the subjects, e.g., a subject that occupies a largest area within a spherical image, at a predetermined position such as the center of the spherical image. In this case, such a subject that occupies a largest area is a subject closer to the photographing point, which is recognized as a main subject. Such an arrangement is applied to the case where a large number of people are surrounding the spherical-image capturing apparatus 10.

Whether the area where the subject is reflected in a spherical image, which is also referred to as a subject area, is cut off at the edge of the spherical image is determined based on the relation between the coordinate values defining the outer shape of the subject area. In this case, the outer shape of the subject area is the rectangle, and the coordinate values correspond to four corners of the rectangle when the subject area is rectangular. For example, as illustrated in FIG. 8B, when the coordinate values RT of the upper-right corner of the subject area is at the left side of the coordinate values LT of the upper-left corner of the subject area, it is determined that the subject area is cut off at the edges of the spherical image.

Further, whether the plurality of subjects is apart from each other in the horizontal direction of the spherical image is determined based on the width of the area where the plurality of subjects is reflected in the spherical image. For example, when the width of the area where the recognized plurality of subjects is reflected in the spherical image occupies most of the 360-degree range of the spherical image, it is determined that the plurality of subjects is apart from each other along the horizontal direction of the spherical image.

In such a configuration, the rotation amount is appropriately determined to place other areas other than the area where one or more recognized subjects are reflected in a spherical image, at the edges L and R of the spherical image.

In a preferred embodiment, in addition to changing the position of the main subject in the horizontal angular direction, the position of the main subject is changed in the vertical direction by modifying the zenith correction as described above based on the subject recognition result.

Figure 9A:
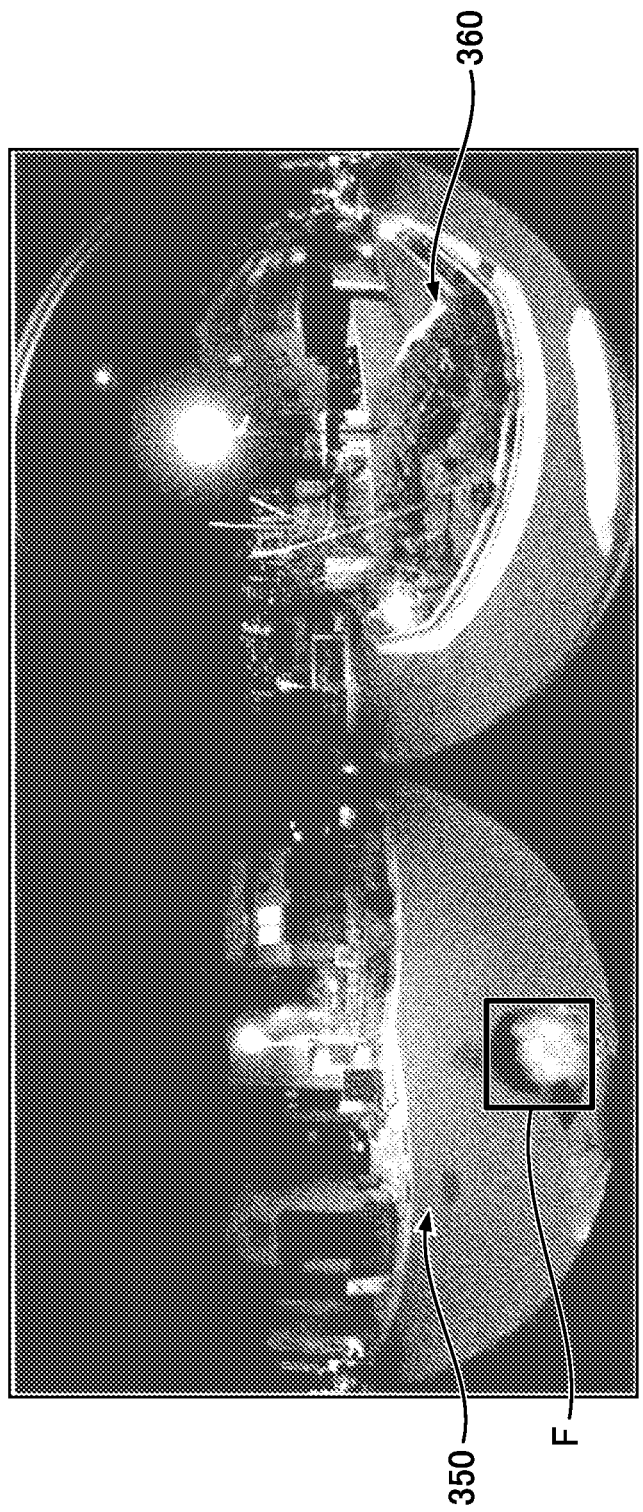
Figure 9B:
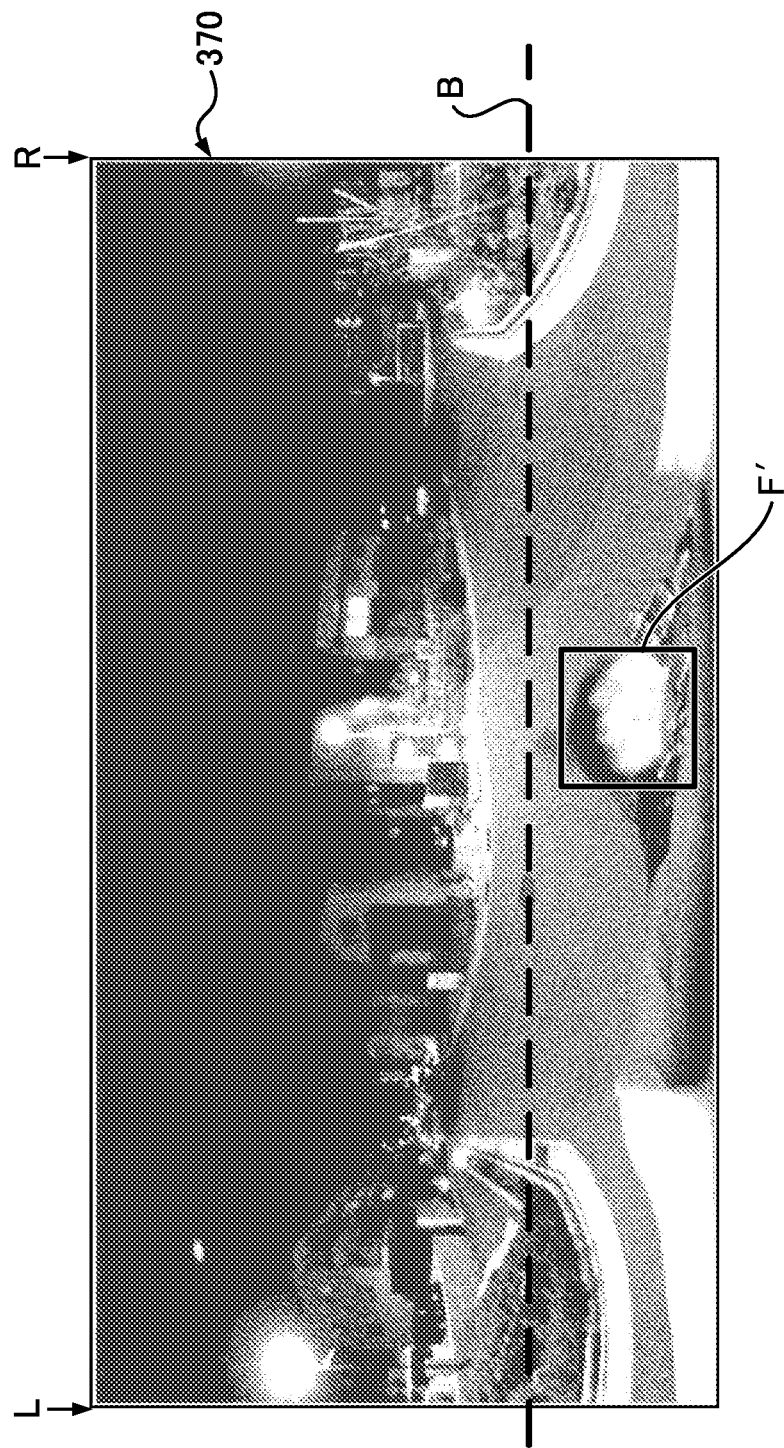

FIGS. 9A, 9B and 9C are illustrations for describing changes in the position of a main subject in a direction of the vertical angle with respect to a spherical image, according to the present embodiment.

FIG. 9A indicates two partial images 350 and 360, and FIG. 9B indicates a spherical image 370 on which zenith correction has been performed.

FIG. 9C indicates a spherical image 380 on which the position of the subject has been changed by further modifying the spherical image 370 on which the zenith correction has been performed, based on the subject recognition result.

In FIG. 9A, a subject (the face of a person) is recognized as an area F on the partial image 350. In FIG. 9B, an area F' of the subject recognized in FIG. 9A is indicated in the spherical image 370 on which the zenith correction has been performed.

In the spherical image 370, on which the zenith correction has been performed, as illustrated in FIG. 9B, the area F' of the subject is positioned at substantially the center of the spherical image 370 in the horizontal direction while being positioned closer to the highest latitude in the vertical direction of the spherical image 370. In a spherical image, the distortion increases as the coordinates become closer to the highest latitude. For this reason, in such a spherical image 370 in which a person is photographed as a subject, the face of the person, which is positioned closer to the highest latitude, might be distorted to look unnatural.

In view of the above, in the person-photographing mode according to the present embodiment, the rotation-amount determination unit 242 first calculates the rotation amount in the roll and pitch directions based on the inclination detection result of the inclination detection unit 250, which is the same as in the regular mode.

At the same time, when it is determined that the area F' of the subject recognized within the spherical image 370 satisfies a prescribed degree, the rotation-amount determination unit 242 calculates an additional rotation amount in the pitch direction to move the subject area F'" to be positioned closer to the center in the vertical direction within the spherical image 380. Based on the calculated additional rotation amount, the rotation-amount determination unit 242 modifies the rotation amount in the pitch direction calculated for the zenith correction so as to obtain, as the final result, a rotation amount in the pitch direction. The image rotation unit 244 rotates the spherical image 380 by the rotation amount in the roll and pitch directions finally determined by the rotation-amount determination unit 242.

The above-described prescribed degree is satisfied when the subject area is positioned closer to the pole (in the highest latitude) relative to a reference line B indicated in FIG. 9B in the vertical direction in the spherical image after the zenith correction. The reference ling B is, for example, at 30 degrees north latitude or south latitude. The additional rotation amount calculated by the rotation-amount determination unit 242 is a rotation amount to move the subject area, which is positioned at a higher latitude than the reference line B in the vertical direction, at least onto the reference line B within the spherical image after the zenith correction.

In the regular mode, the zenith correction is performed to have the central axis coincide with the direction of gravity. However, in the person-photographing mode according to the present embodiment, a modification is added to the zenith correction to have the central axis coincide with the direction of gravity, based on the subject recognition result of the subject recognition unit 230.

With such an additional modification, in the person-photographing mode, the central axis might not coincide with the direction of gravity as illustrated in FIG. 9C. In other words, when the above-described prescribed degree is satisfied, the zenith correction is partially sacrificed. In view of this, in the case where the prescribed degree is satisfied, the zenith correction is prioritized when there is no large deviation with a change in the position of the main subject in the vertical direction.

As described above, a spherical image, in which the position of the main subject has been changed based on the subject recognition result, is output as a finally generated spherical image. Such an output image looks natural as a spherical image format image. When such an image is displayed with the general-purpose viewer, the face of the person is placed closer to the center of the displayed image of a rectangular shape, which prevents the face of the person from being cut off at the edges of the rectangular image and thus enables a natural-looking picture. In addition, a scaled-down image (thumbnail image) is usually generated based on such a spherical image. In such cases as well, a scaled-down image (thumbnail image) is displayed as a natural-looking picture by using a dedicated viewer, a VR viewer, or general-purpose viewer.

In the example implementation described above, each partial image is converted into an image including a hemispherical portion, and the obtained images are combined or synthesized to generate a spherical image. Then, the rotation correction in the roll, pitch, and yaw directions are performed on the generated spherical image. However, the order of the conversion process, the synthesis processing, and the image rotation is not particularly limited to the above-described embodiment.

In some other embodiments, the partial image A and the partial image B (two spherical images including the complementary hemispherical portions obtained by converting the partial images A and B) may be subjected to the image rotation before being synthesized. Alternatively, in addition to performing the rotation coordinate transformation on images in spherical format, the image rotation in roll, pitch and yaw directions is reflected in the conversion table for converting partial images to spherical images, and then a spherical image on which the correction has been performed may be generated directly from the partial images A and B based on the conversion table in which the image rotation has been reflected.

The following describes the spherical image capturing process to change the position of the subject in more detail, according to the present embodiment, with reference to FIG. 10. Note that the spherical image capturing process in FIG. 10 is described assuming that a spherical still image is captured. Further, the spherical image capturing process in FIG. 10 is described assuming that the spherical-image capturing apparatus 10 performs each processing operation. More specifically, the CPU 130 and other hardware blocks such as the distortion correction-synthesizing operation block 118, the face detection block 119, the ISP 108, and the still-image compression block 134 of the spherical-image capturing apparatus 10 execute the processing operations in FIG. 10.

The processing in FIG. 10 is started, for example, upon detecting that the user has pressed the shutter button 18. In step S101, the spherical-image capturing apparatus 10 refers to the setting value set for itself, and identifies whether the selected mode is the regular mode or the person-photographing mode. In step S102, the process branches depending on the identified selected mode. In other words, the spherical-image capturing apparatus 10 determines whether the mode at which the following processes are performed is the person-photographing mode or the regular mode based on the identified selected mode.

When it is determined that the selected mode is the regular mode in step S102, the processing operation proceeds to step S103.

In step S103, the spherical-image capturing apparatus 10 controls the two image sensors 22A and 22B in FIG. 2 to capture two partial images at the regular mode.

In step S104, the spherical-image capturing apparatus 10 controls the motion sensor 120 in FIG. 2 to detect the inclination of the spherical-image capturing apparatus 10 relative to a prescribed reference direction and obtains an inclination detection result.

In step S105, the spherical-image capturing apparatus 10 determines the amount of rotation in the roll, pitch, and yaw directions (as appropriate) using the rotation-amount determination unit 242 based on the inclination detection result. Then, the processing operation proceeds the process to step S113.

When it is determined that the selected mode is the person-photographing mode in step S102, the processing operation proceeds to step S106.

In step S106, the spherical-image capturing apparatus 10 controls the two image sensors 22A and 22B in FIG. 2 to capture two partial images at, for example, the person-photographing mode.

In step S107, the spherical-image capturing apparatus 10 controls the motion sensor 120 in FIG. 2 to detect the inclination of the spherical-image capturing apparatus 10 relative to a prescribed reference direction and obtains an inclination detection result.

In step S108, the spherical-image capturing apparatus 10 determines the amount of rotation in the roll and pitch directions using the rotation-amount determination unit 242 based on the inclination detection result. In the person-photographing mode, the rotation amount in the yaw direction is not calculated based on the inclination detection result.

In step S109, the spherical-image capturing apparatus 10 obtains the subject recognition result using the subject recognition unit 230.

In step S110, the spherical-image capturing apparatus 10 determines the amount of rotation in yaw direction based on the subject recognition result.

In step S111, the spherical-image capturing apparatus 10 determines whether or not the vertical position of the subject satisfies a prescribed condition (the above-described prescribed degree).

When it is determined that the prescribed condition is satisfied in step S111 (YES in step S111), the processing operation proceeds to step S112. In step S112, the spherical-image capturing apparatus 10 modifies the rotation amount in the pitch direction determined by the rotation-amount determination unit 242 based on the inclination detection result in steps S108, and advances the processing operation to step S113.

In either one of the regular mode and the person-photographing mode, two partial images are acquired and the amount of rotation in the roll, pitch, and yaw directions is obtained before the step S113.

In step S113, the spherical-image capturing apparatus 10 applies the rotation correction to a spherical image to be output, with the rotation amount in the roll, pitch, and yaw directions determined by the image rotation unit 244. More specifically, the rotation coordinate transformation in terms of the rotation amount in the roll, pitch, and yaw directions is reflected in the conversion table as illustrated in FIG. 4C.

In step S114, the spherical-image capturing apparatus 10 corrects distortion of each of the partial images using the conversion table in which the rotation correction of step S113 is reflected, by using the image synthesizing unit 240 to obtain two corrected images, each including a complementary hemispherical portion. Then, the spherical-image capturing apparatus 10 further synthesizes the two corrected images so as to generate a spherical image. More specifically, in step S114, the connection position between the two corrected images is detected through, for example, pattern matching as appropriate, and the synthesis processing is performed on two obtained partial images according to the detected connection position. During the synthesis processing, blending or the like is appropriately performed in the overlapping area between the corrected images.

In step S115, the spherical-image capturing apparatus 10 outputs the spherical image generated by the synthesis processing, for example, in the JPEG format, by using the data output processing unit 260 to a storage device, a recording medium, a monitor, a portable information terminal, or the like. Then, the processing ends.

In the above description, an example of the spherical image capturing process is described with reference to FIG. 10 assuming that a spherical image is generated as a still image. In other cases of capturing a spherical moving image, a particular frame of a moving image is sometimes displayed as a thumbnail. For displaying such a thumbnail, the process of changing the position of the main subject according to the present embodiment is applicable to a frame to be used for displaying a thumbnail.

Further, in the above-described embodiment, the mode in which the zenith correction is performed is referred to as the regular mode as distinguished from the person-photographing mode. In some examples, another mode in which the zenith correction is not performed may be prepared, or the process may be segmented depending on the presence or absence of the rotation correction in the yaw direction.

In the above description with reference to FIG. 10, it is assumed that the spherical-image capturing apparatus 10 performs all of the process of capturing images, the process of changing the position of the main subject, and the process of synthesizing the images to generate a spherical image. However, in another embodiment, the spherical-image capturing apparatus 10 captures images, and based on the image data, the process of changing the position of the main subject according to the present embodiment is performed on either one of the spherical-image capturing apparatus 10 or another information processing apparatus.

For example, during the photographing, the spherical-image capturing apparatus 10 captures a plurality of partial images each having a different captured range and temporarily stores, as a metadata, an image file of an image, such as a RAW image in a dual-fisheye format, including the plurality of partial images. Such a metadata holds the above-described inclination detection result, the subject recognition result, and the selection of the person-photographing mode. Subsequently, either one of the spherical-image capturing apparatus 10 and the information processing apparatus reads the image file, and during the process of converting the partial images into a spherical image assuming that the person-photographing mode is selected, synthesizes the partial images to generate a spherical image while changing the position of the main subject. Note that the subject recognition result may be obtained as ex post facto in the recognition process, and the person-photographing mode may be selected as ex post facto.

For another example, during the photographing, the spherical-image capturing apparatus 10 captures a plurality of partial images each having a different captured range, synthesizes the plurality of partial images to generate a spherical image, and temporarily stores, as a metadata, an image file of the generated spherical image before or after the zenith correction in an equirectangular format. Such a metadata holds the above-described inclination detection result, the subject recognition result, and the selection of the person-photographing mode, as appropriate. Subsequently, either one of the spherical-image capturing apparatus 10 and the information processing apparatus reads the image file, and when the person-photographing mode is selected, rotates the spherical image to change the position of the main subject synthesizes the partial images so as to generate a spherical image to be output.

When these processing operations are performed by the information processing apparatus, the CPU and other hardware blocks including a hardware accelerator of the information processing apparatus performs these processing operation. In addition, the spherical-image capturing apparatus 10 and the information processing apparatus are combined to constitute an imaging system, and in the imaging system, the spherical-image capturing apparatus 10 and the information processing apparatus cooperate to capture a spherical image (a plurality of partial images) and also synthesize the partial images to generate a spherical image. In this case, these processing operations are shared by the spherical-image capturing apparatus 10 and the information processing apparatus as desired.

Figure 11:
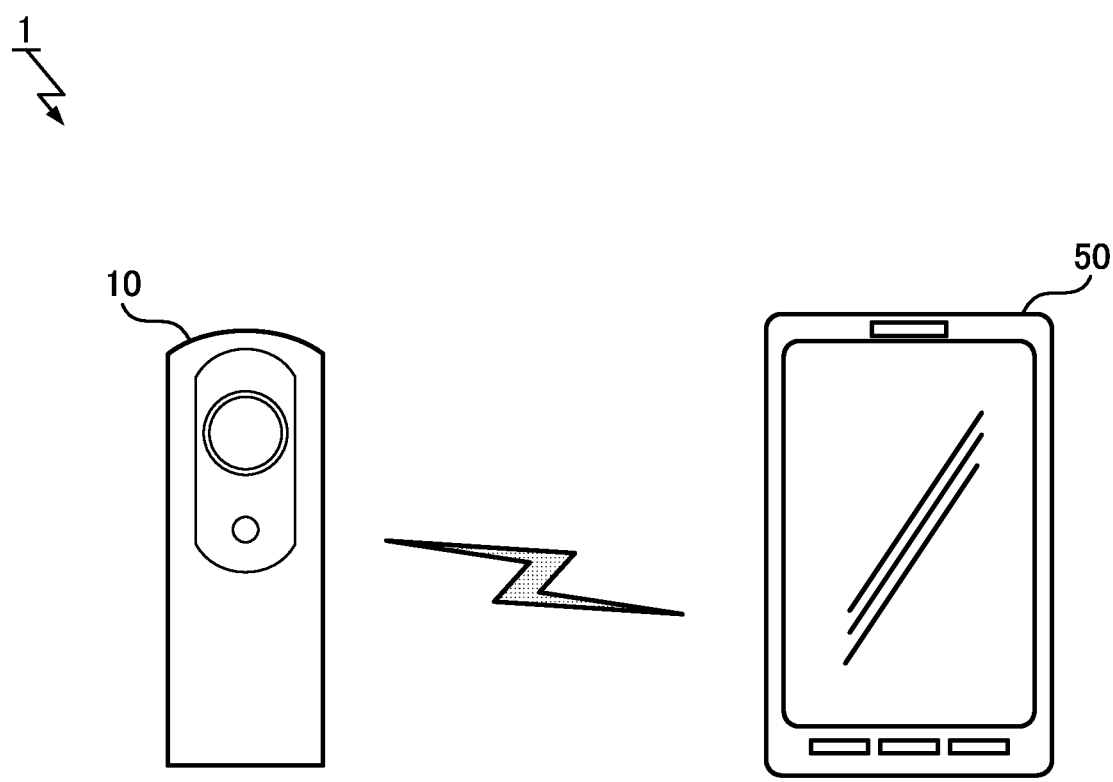
FIG. 11 is a schematic diagram illustrating an overall configuration of an imaging system according to another embodiment.

FIG. 11 is a schematic diagram illustrating an overall configuration of an imaging system 1 according to another embodiment. As illustrated in FIG. 11, the imaging system 1 is configured by combining the spherical-image capturing apparatus 10 and the information processing apparatus 50.

Figure 12:
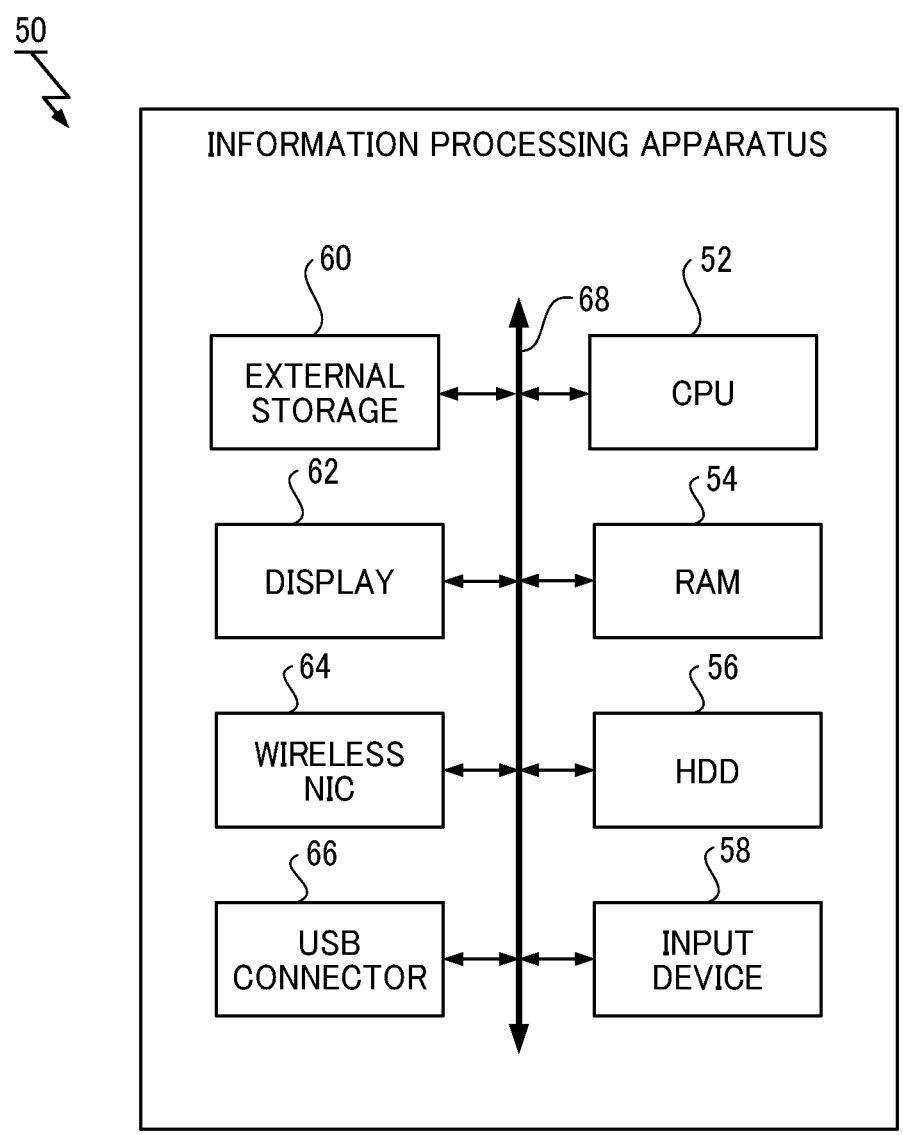
FIG. 12 is a hardware block diagram of an information processing apparatus that constitutes the imaging system according to another embodiment.

FIG. 12 is a block diagram of the hardware configuration of an information processing apparatus 50 that constitutes the imaging system 1 including the spherical-image capturing apparatus 10, according to another embodiment.

In various implementations, the information processing apparatus 50 may be a mobile device such as a smartphone and a tablet computer, a personal computer, a workstation, a server computer, a computer system, and the like.

The information processing apparatus 50 illustrated in FIG. 12 includes a CPU 52, a random access memory (RAM) 54, and hard disk drive (HDD) 56.

The CPU 52 controls the operations of components of the information processing apparatus 50, or controls the overall operations of the information processing apparatus 50. The information processing apparatus 50 may include circuitry or processing circuitry, such as CPU 52.

The RAM 54 provides a work area for the CPU 52.

The HDD 56 stores therein an operating system and a control program, such as an application, that executes processes in the information processing apparatus 50 according to the present implementation, each of the operating system and the control program being written in a code decodable by the CPU 52. The information processing apparatus 50 may include Solid State Drive (SSD) instead of HDD.

The information processing apparatus 50 may include an input device 58, an external storage 60, a display 62, a wireless NIC 64, and a USB connector 66.

The input devices 58 are input devices, such as a mouse, a keyboard, a touchpad, and a touchscreen, and provide a user interface.

The external storage 60 is a removable recording medium mounted, for example, in a memory card slot, and records various types of data, such as image data in a video format and still image data.

The display 62 performs the display of an operation screen, the display of the monitor image of the image captured by the spherical-image capturing apparatus 10 that is that is ready to capture or is capturing an image or is capturing an image, and the display of the stored video or still image for reproducing or viewing.

The display 62 and the input device 58 enable, through the operation screen, making instructions for image capturing or changing various kinds of setting in the spherical-image capturing apparatus 10.

The wireless NIC 64 establishes a connection for wireless LAN communication with an external device such as the spherical-image capturing apparatus 10. The USB connector 66 provides a USB connection to an external device such as the spherical-image capturing apparatus 10.

By way of example, the wireless NIC 64 and the USB connector 66 are described. However, limitation to any specific standard is not intended, and connection to an external device may be established through another wireless connection such as Bluetooth (registered trademark) and wireless USB or through a wired connection such as wired local area network (LAN). The wireless communication may be a 3 generation (G) or 4G, or may be 5G that is a fifth generation mobile communication system.

When power is supplied to the information processing apparatus 50 and the power thereof is turned on, the program is read from a ROM or the HDD 56, and loaded into the RAM 54. The CPU 52 follows the program read into the RAM 54 to control the operations of the parts of the device, and temporarily stores the data required for the control in the memory. This operation implements functional units and processes of the information processing apparatus 50, as will be described later. Examples of the program include an application for giving various instructions to the connected the spherical-image capturing apparatus 10 and requesting an image through a bus 68.

The embodiments of the present disclosure provide an imaging system, an image processing apparatus, an imaging device, and a recording medium that enable outputting an image (an output image) that covers a range of 360 degrees in at least one direction while preventing a part of a subject from being cut off at the edge of the image.

JP-2019-009574 discloses the technology that displays each image with the photographer himself/herself positioned in the center of the image in producing planar images obtained through the projective transformation of a spherical image captured by the selfie.

The technology of JP-2019-009574 sets the determined coordinates at the center of the generated spherical image during the process of generating a planar image by the projective transformation to be displayed by the display device after generating a spherical image by connecting and synthesizing the captured images.

However, the spherical image data itself is still as-captured. Such an image can be displayed with nothing but a viewer that implements the technology of JP-2019-009574, and when displayed with a general purpose image viewer, the composition of as-captured spherical-image data still remains in the displayed image.

In order to avoid such a situation, the embodiments of the present disclosure provide an imaging system configured to place the area where a subject, such as the face of a person, is reflected in a captured image at a predetermined position to prevent the area from being cut off at the edges of the captured image. The captured image is an output image (for example, a spherical image) that covers a range of 360 degrees at least a first direction (for example, the horizontal direction).

With this configuration, such an output image can be displayed as a natural-looking picture with a general-purpose imaging viewer while preventing a main subject from being cut off at the edges of the displayed image. Thus, the quality of obtained images can be improved.

The functional units as described above is implemented by a computer-executable program written by legacy programming language or object-oriented programming language such as assembler language, C language, C++ language, C# language, and Java (registered trademark), and the program can be distributed via telecommunication line or upon being written on a computer-computer-readable recording medium such as ROM, electrically erasable and programmable read only memory (EEPROM), erasable programmable read only memory (EPROM), flash memory, flexible disk, compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO). All or some of the functional units described above can be implemented, for example, on a programmable device such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL), Very High Speed Integrated Circuit Hardware Description Language (VHDL), or Verilog HDL.

Numerous additional modifications and variations are possible in light of the above teachings. It is therefore to be understood that, within the scope of the appended claims, the disclosure of this patent specification may be practiced otherwise than as specifically described herein.

Numerous additional modifications and variations are possible in light of the above teachings. It is therefore to be understood that, within the scope of the appended claims, the disclosure of this patent specification may be practiced otherwise than as specifically described herein. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The processing apparatuses can include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

This patent application is based on and claims priority pursuant to Japanese Patent Application No. 2019-119694, filed on Jun. 27, 2019 in the Japan Patent Office, the entire disclosure of which is hereby incorporated by reference herein.

EXPLANATION OF REFERENCE SIGNS

1 Imaging system
10 Spherical-image capturing apparatus
12 Imaging body
14 Casing
18 Shutter button
20 Lens system
22 Image sensor
50 Information processing apparatus
52 CPU
54 RAM
56 HDD
58 Input device
60 External storage
62 Display
64 Wireless NIC
66 USB connector,
68 Bus
100 Processor
102 Lens barrel unit
108 ISP
110, 122 DMAC
112 Arbiter (ARBMEMC)
114 MEMC
116, 138 SDRAM
118 Distortion correction-synthesizing operation block
120 Motion sensor
124 Image processing block
126 Image data transferrer
128 SDRAMC
130 CPU
132 Resize block
134 Still-image compression block
136 Moving image compression block
140 Memory card control block
142 memory card slot
144 Flash ROM
146 USB block
148 USB connector
150 Peripheral block
152 Audio unit
154 Speaker
156 Microphone
158 Serial block
160 Wireless NIC
162 LCD driver
164 LCD monitor
166 Power switch
168 Bridge
170 Automatic exposure control unit
172 AE register
174 White balance value calculation unit
176 White balance processing
200 Image processing unit
210 Selection receiving unit
220 Partial image acquisition unit
230 Subject recognition unit
240 Image combining unit
242 Rotation-amount determination unit
244 Image rotation unit
250 Inclination detection unit
260 Data output processing unit
300, 310, 350, 360 Partial image
320, 370 Spherical image after zenith correction
330, 380 Spherical image on which the position of a has been changed

The invention claimed is:

1. An imaging system, comprising:
a plurality of imagers facing different directions, the plurality of imagers configured to capture images;
inclination detection circuitry configured to detect an inclination of the plurality of imagers;

recognition circuitry configured to recognize a subject reflected in the images captured by the plurality of imagers, rotation-amount determination circuitry configured to:
 determine a first amount of rotation in roll and pitch directions based on the inclination detected by the inclination detection circuitry; and
 determine a second amount of rotation in a yaw direction based on a recognition result of the recognition circuitry; and processing circuitry configured to
 perform image rotation, based on the first amount of rotation and the second amount of rotation, on the images captured by the plurality of imagers to change a position of an area in a horizontal direction where the subject is reflected to a predetermined position,
 synthesize the images corrected by the image rotation to generate an output image which covers a range of 360 degrees in at least a first direction, and
 output the output image, wherein
the position of the area is changed to the predetermined position so as to prevent the area from being cut off at edges of the output image, and
the predetermined position is substantially at a center of the output image in the horizontal direction so that the area where the subject is reflected is not divided at the edges of the output image.

2. The imaging system according to claim 1, wherein
the output image covers a range of 360 degrees in a second direction orthogonal to the first direction, and
when the position of the area where the subject is reflected satisfies a prescribed degree, the processing circuitry performs an additional image rotation on the images on which the image rotation has been performed, so as to place the area where the subject is reflected at substantially the center of the output image in the second direction.

3. The imaging system according to claim 2, wherein
based on the inclination detected by the inclination detection circuitry, the processing circuitry performs zenith correction through the image rotation,
the prescribed degree is satisfied such that the area where the subject is reflected is positioned closer to either one of the edges of the output image, and
in a case that the prescribed degree is satisfied, the zenith correction is modified so as to prevent the area from being cut off at edges of the output image.

4. The imaging system according to claim 1, wherein
the subject includes a plurality of subjects, and
a center of gravity of the area where the plurality of subjects is included together or a center of gravity of any one of the plurality of subjects is placed at the predetermined position.

5. The imaging system according to claim 1, wherein another area other than the area the subject is reflected is positioned at the edges of the output image.

6. The imaging system according to claim 1, wherein a scaled-down image, in which the area where the subject is reflected is not cut off at the edges of the scaled-down image, is generated based on the output image.

7. The imaging system according to claim 1, wherein the subject is at least one of a face of a person, a face of an animal, a whole body of an animal, a part of an object, and a whole of an object.

8. The imaging system according to claim 1, wherein
the images captured by the plurality of imagers include a plurality of partial images captured by a plurality of imaging optical systems,
the recognition circuitry recognizes the subject in the plurality of partial images or a synthesized image of the plurality of partial images, and
the output image is the synthesized image.

9. The imaging system according to claim 8, wherein
the plurality of imaging optical systems includes a plurality of fish-eye lenses or wide-angle lenses,
the plurality of partial images is a plurality of fisheye images or wide-angle images, and
each of the output image and the synthesized image is a spherical image in a spherical coordinate system obtained by performing distortion correction and synthesis processing on the plurality of partial images.

10. An image processing apparatus, comprising:
image acquisition circuitry configured to acquire, as an input image, a plurality of partial images each having a different captured range or a synthesis image of the plurality of partial images;
inclination detection circuitry configured to detect an inclination of the plurality of imagers;
recognition circuitry configured to recognize a subject reflected in the input image acquired by the image acquisition circuitry;
rotation-amount determination circuitry configured to:
 determine a first amount of rotation in roll and pitch directions based on the inclination detected by the inclination detection circuitry; and
 determine a second amount of rotation in a yaw direction based on a recognition result of the recognition circuitry;
image rotation circuitry configured to perform image rotation, based on the first amount of rotation and the second amount of rotation, on the input image to change a position of an area in a horizontal direction where the subject is reflected to a predetermined position; and
generation circuitry configured to generate an output image based on the input image corrected by the image rotation which covers a range of 360 degrees in at least a first direction, and the position of the area is located at the predetermined position to prevent the area of the subject from being cut off at edges of the image, wherein
the predetermined position is substantially at a center of the output image in the horizontal direction so that the area where the subject is reflected is not divided at the edges of the output image.

11. An imaging device, comprising:
the image processing apparatus according to claim 10; and
a plurality of imagers configured to capture the plurality of partial images.

12. An image processing method, comprising:
acquiring, as an input image, a plurality of partial images captured by a plurality of imagers, wherein each partial image of the plurality of partial images has a different captured range;
detecting an inclination of the plurality of partial imagers;
recognizing a subject reflected in the input image;
determining a first amount of rotation in roll and pitch directions based on the inclination detected by the detecting;

determining a second amount of rotation in a yaw direction based on a recognition result of the recognizing;

performing image rotation, based on the first amount of rotation and the second amount of rotation, on the input image to change a position of an area in a horizontal direction where the subject is reflected to a predetermined position; and generating an output image based on the input image corrected by the image rotation, wherein the output image covers a range of 360 degrees at least a first direction, the position of the area is located at the predetermined position to prevent the area of the subject from being cut off at the edges of the output image, and the predetermined position is substantially at a center of the output image in the horizontal direction so that the area where the subject is reflected is not divided at the edges of the output image.

13. A non-transitory recording medium storing a computer-readable code for controlling a computer system to carry out the method according to claim 12.

* * * * *